(12) United States Patent
Wang et al.

(10) Patent No.: US 11,783,630 B2
(45) Date of Patent: Oct. 10, 2023

(54) METHOD FOR TRANSMITTING FACE IMAGE DATA, TRANSFERRING VALUE, APPARATUS, AND ELECTRONIC DEVICE

(71) Applicant: TENCENT TECHNOLOGY (SHENZHEN) COMPANY LIMITED, Shenzhen (CN)

(72) Inventors: Shaoming Wang, Shenzhen (CN); Zhijun Geng, Shenzhen (CN); Jun Zhou, Shenzhen (CN); Runzeng Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 157 days.

(21) Appl. No.: 17/516,632

(22) Filed: Nov. 1, 2021

(65) Prior Publication Data
US 2022/0058376 A1 Feb. 24, 2022

Related U.S. Application Data

(63) Continuation of application No. PCT/CN2020/120302, filed on Oct. 12, 2020.

(30) Foreign Application Priority Data

Dec. 16, 2019 (CN) .......................... 201911296473.X

(51) Int. Cl.
*G06V 40/16* (2022.01)
*G06V 10/98* (2022.01)
(Continued)

(52) U.S. Cl.
CPC .......... *G06V 40/166* (2022.01); *G06V 10/993* (2022.01); *G06V 40/45* (2022.01);
(Continued)

(58) Field of Classification Search
None
See application file for complete search history.

(56) References Cited

U.S. PATENT DOCUMENTS

| 10,586,070 B2 * | 3/2020 | Cai .......................... G06T 11/60 |
| 2007/0127787 A1 * | 6/2007 | Castleman ........... G06V 40/165 |
| | | 382/118 |

(Continued)

FOREIGN PATENT DOCUMENTS

| CN | 110189137 A | 8/2019 |
| CN | 110414200 A | 11/2019 |

(Continued)

OTHER PUBLICATIONS

The World Intellectual Property Organization (WIPO) International Search Report for PCT/CN2020/120302 dated Jan. 13, 2021 6 Pages (including translation).

(Continued)

*Primary Examiner* — Dov Popovici
(74) *Attorney, Agent, or Firm* — ANOVA LAW GROUP PLLC

(57) ABSTRACT

This application provides a method for transmitting face image data and transferring value, apparatuses, an electronic device, and a storage medium, which belongs to the field of network technologies. The method for transmitting face image data includes acquiring a face data stream through the sensor, and transmitting the face data stream to the first processor; performing image screening on a face image in the face data stream by the first processor to obtain at least a target face image, the target face image meeting a target condition; retrieving a target web address from the memory by the first processor; and transmitting the target face image to the target web address by the first processor.

20 Claims, 8 Drawing Sheets

(51) Int. Cl.
*G06V 40/40* (2022.01)
*H04L 9/08* (2006.01)
*H04N 1/00* (2006.01)
*H04N 1/44* (2006.01)

(52) U.S. Cl.
CPC ....... *H04L 9/0866* (2013.01); *H04N 1/00209* (2013.01); *H04N 1/00244* (2013.01); *H04N 1/4486* (2013.01); *H04N 1/4493* (2013.01); *H04L 2209/56* (2013.01); *H04N 2201/0084* (2013.01)

(56) References Cited

U.S. PATENT DOCUMENTS

| | | |
|---|---|---|
| 2015/0254508 A1 | 9/2015 | Kimura et al. |
| 2018/0260546 A1 | 9/2018 | Iwata et al. |
| 2020/0219071 A1 | 7/2020 | Jung et al. |
| 2020/0342081 A1* | 10/2020 | Nam ............... H04L 63/0861 |
| 2022/0075998 A1* | 3/2022 | Wang ............... G06V 40/168 |

FOREIGN PATENT DOCUMENTS

| | | |
|---|---|---|
| CN | 110555706 A | 12/2019 |
| CN | 111046365 A | 4/2020 |
| JP | 2004005532 A | 1/2004 |
| JP | 2015170099 A | 9/2015 |
| WO | 2017170384 A1 | 10/2017 |
| WO | 2018156869 A1 | 8/2018 |
| WO | 2018230958 A2 | 12/2018 |

OTHER PUBLICATIONS

The Japan Patent Office (JPO) Notification of Reasons for Refusal for Application No. 2022-514576 and Translation dated Apr. 26, 2023 4 Pages.

* cited by examiner

METHOD FOR TRANSMITTING FACE IMAGE DATA, TRANSFERRING VALUE, APPARATUS, AND ELECTRONIC DEVICE

RELATED APPLICATIONS

This application is a continuation of PCT Application PCT/CN2020/120302, filed on Oct. 12, 2020, which in turn claims priority to Chinese Patent Application No. 201911296473.X, entitled "METHOD FOR TRANSMITTING FACE IMAGE DATA, METHOD FOR TRANSFERRING VALUE, APPARATUSES, AND ELECTRONIC DEVICE", and filed on Dec. 16, 2019. The two applications are incorporated herein by reference in their entirety.

FIELD OF THE TECHNOLOGY

This application relates to the field of network technologies, and in particular, to a method for transmitting face image data, a method for transferring value, apparatuses, an electronic device, and a storage medium.

BACKGROUND OF THE DISCLOSURE

With the development of network technologies, a user can trigger a value transfer operation through a terminal. For example, the terminal first verifies whether the user is the user himself/herself based on a face recognition technology, and then performs the value transfer operation after the verification is successful.

Usually, after acquiring a face image of the user by using a camera, the terminal directly transmits the face image (also referred to as raw data) to a processor in a rich execution environment (REE), the processor in the REE uploads the face image to a server, and the server performs face recognition on the face image to generate a recognition result. When the recognition result is "yes", the subsequent value transfer operation is triggered. The REE of the terminal is also referred to as an ordinary execution environment of the terminal. The REE can access software and hardware resources provided by some platforms. The hardware resources include the processor of the REE, and the software resources include commonly used mobile operating systems such as the Android system.

SUMMARY

Embodiments of this application provide a method for transmitting face image data, a method for transferring value, apparatuses, an electronic device, and a storage medium. The technical solutions are as follows:

One aspect of the present disclosure provides a method for transmitting face image data, applicable to a camera component of a terminal, the camera component including a sensor, a first processor, and a memory, the memory being at least one of a trusted execution environment (TEE) element or a secure element (SE). The method includes acquiring a face data stream through the sensor, and transmitting the face data stream to the first processor; performing image screening on a face image in the face data stream by the first processor to obtain at least a target face image, the target face image meeting a target condition; retrieving a target web address from the memory by the first processor; and transmitting the target face image to the target web address by the first processor.

Another aspect of the present disclosure provides a method for transferring value, applicable to a terminal, the terminal including a camera component and a host, the camera component running in a trusted execution environment (TEE). The method includes transmitting a verification request to a server by the camera component, the verification request carrying a target face image, the target face image meeting a target condition; receiving, in a case that verification of the verification request by the server is successful, a verification success response by the camera component, the verification success response carrying a face image identification, the face image identification uniquely identifying the target face image; transmitting the face image identification to the host by the camera component; and transmitting a value transfer request to the server by the host, the server being requested to performing a value transfer operation based on the value transfer request, the value transfer request carrying a user identification, the face image identification, and value transfer information.

Another aspect of the present disclosure provides a method for transferring value, applicable to a server. The method includes receiving a value transfer request, the value transfer request carrying a user identification, a face image identification, and value transfer information, the face image identification uniquely identifying a target face image, the target face image meeting a target condition; querying a target face image corresponding to the face image identification and a standard image corresponding to the user identification; performing face recognition based on the target face image and the standard image to obtain a recognition result; and performing, in a case that the recognition result is successful, a value transfer operation based on the value transfer information.

Another aspect of the present disclosure provides an apparatus for transmitting face image data, including a camera component of a terminal, the camera component including a sensor, a first processor, and a memory, the memory including at least one of a trusted execution environment (TEE) element or a secure element (SE). The sensor is configured to acquire a face data stream, and transmit the face data stream to the first processor; the first processor is configured to perform image screening on a face image in the face data stream to obtain a target face image, the target face image meeting a target condition; the first processor is further configured to retrieve a target web address from the memory; and the first processor is further configured to transmit the target face image to the target web address.

Another aspect of the present disclosure provides a non-transitory storage medium, storing at least one program code, the at least one program code being loaded and executed by a processor to implement the operations performed in the face image transmission method or the value transfer method according to any one of the foregoing possible implementations.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art can still derive other drawings from these accompanying drawings without creative efforts.

DESCRIPTION OF EMBODIMENTS

Figure 1:
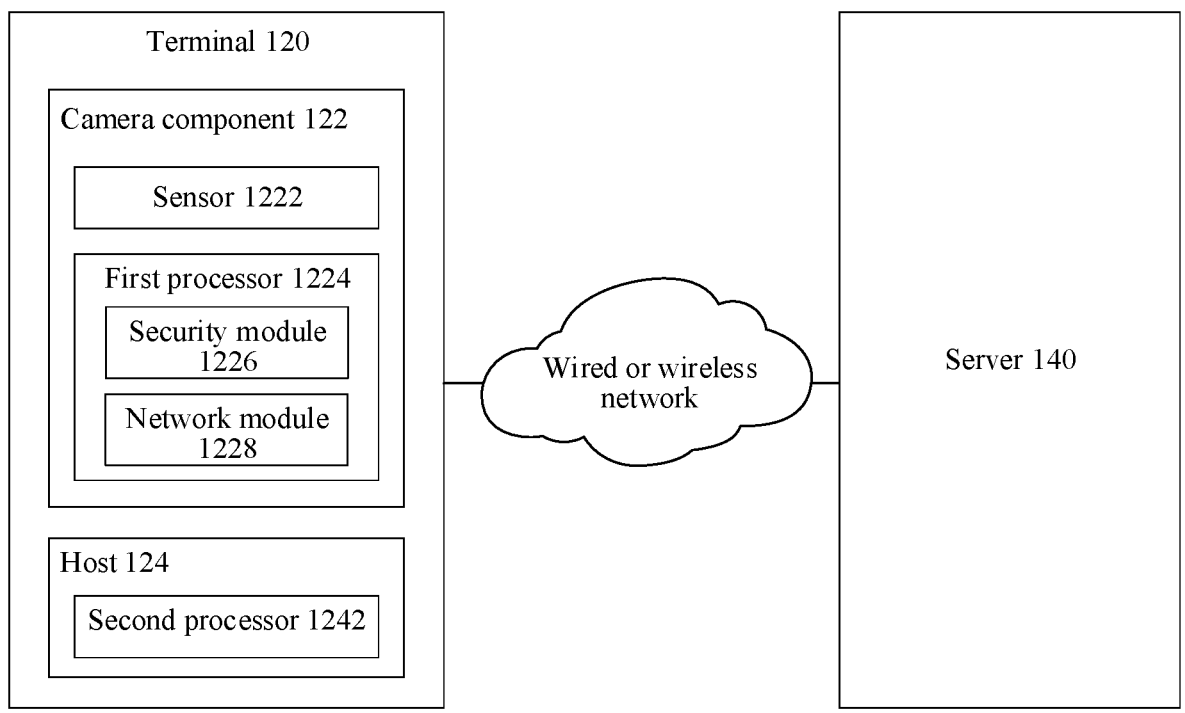
FIG. 1 is a schematic diagram of an implementation environment of a method for transmitting face image data according to an embodiment of this application.

To make the objectives, technical solutions, and advantages of this application clearer, the following further describes the implementations of this application in detail with reference to the accompanying drawings.

In the related art, an operating system and various applications running in an REE have large code and frequent vulnerabilities, causing poor security of the REE. That is, the process of transmitting face images based on the REE has poor security.

The following describes the terms involved in the embodiments of this application.

1. TEE and REE

With the rapid development of mobile networks and terminals, as well as the smart consumer electronic products becoming more and more popular, there are more and more types and quantities of applications (APPs). Current APPs are not limited to the expansion of basic functions and entertainment functions of a terminal, and the APPs are gradually expanding to all walks of life, such as financial APPs related to mobile payment, content copyright protection APPs, and security APPs of thin terminals under cloud computing. These industry APPs require a terminal running environment with a higher security level.

However, the design of an operating system of a terminal mainly focuses on functional requirements, not from a security perspective. In addition, with the openness, large scale, and complexity of the entire system, corresponding system vulnerabilities cannot be eliminated, resulting in continuous appearance of malicious programs that exploit these vulnerabilities, thereby causing APPs to be in danger. Although some software protection means, such as firewalls and anti-virus software, can be used for corresponding protection, due to the endless emergence of new virus programs and frequent system updates and upgrades, complete software protection cannot be achieved.

Because of these problems, the industry has carried out in-depth research and proposed a new solution, that is, to divide the same hardware device into two independent and hardware-isolated execution environments: REE (also referred to as ordinary execution environment) and TEE.

Software and hardware resources on a platform can be separately identified as two execution environment states. Software and hardware resources identified as a safe execution state can only be accessed by the TEE. Software and hardware resources identified as an ordinary execution state can be accessed by two execution environments (TEE and REE). The REE can run currently commonly used mobile operating systems, for example, Android. The TEE can run a secure operating system that has simple functions and a small amount of code, is closed, and can be audited and controlled manually.

APPs with higher security requirements can be deployed in a secure operating system, and security services are provided for APPs with lower security requirements deployed in a mobile operating system. Therefore, APPs running in the TEE can be referred to as trusted applications (TA), and APPs running in the REE can be referred to as client applications (CA, also referred to as ordinary applications). When an ordinary application invokes a corresponding security application for execution, a hardware device is switched from REE to TEE for execution. In this case, the entire hardware device is in a trusted state, and the interaction between the device and the outside is controlled, to ensure true and trusted behaviors.

A software and hardware execution environment of the TEE is similar to that of the REE. The isolation of physical operating environments of the TEE and REE can be achieved by using unique technologies of chips, such as a Trustzone technology and a multi-central processing unit (CPU) technology, to ensure the security of trusted APPs in the TEE. Peripherals used by the TEE need to have security attributes, to avoid the risk of security data leakage when the TEE accesses the peripherals.

2. TEE Element and SE

TEE elements involved in the embodiments of this application are also the hardware execution environment of the foregoing TEE, such as elements supporting the Trustzone technology or elements supporting the multi-CPU technology. A TEE element may be a security module built in a processor, or may be a security module independent of a processor. The TEE element can provide a secure region in the terminal to ensure that sensitive data (for example, face images) can be stored, processed, and protected in an isolated and trusted TEE. Whether a TEE element is built in a processor is not specifically limited in the embodiments of this application.

An SE involved in the embodiments of this application is usually provided in the form of a chip. To prevent external malicious analysis attacks and protect data security, there is an encryption/decryption logic circuit in the SE chip. Similarly, an SE may be a security module built in a processor, or may be a security module independent of a processor. Whether an SE is built in a processor is not specifically limited in the embodiments of this application.

The TEE element or the SE may be collectively referred to as a "security module". The security module can achieve data isolation in a physical running environment of the REE. In the embodiments of this application, the security module can be used to store a target web address and a target key, so that the security module can be regarded as a special, safe, and trusted memory. The target web address refers to a web address used for requesting a face image identification. The target key refers to an encryption key of a face image. The security module is built in a camera component of a terminal. The target key may be burned into the TEE element or SE chip when the camera component leaves the factory. An implementation environment of the embodiments of this application is described below.

FIG. 1 is a schematic diagram of an implementation environment of a method for transmitting face image data according to an embodiment of this application. Referring to FIG. 1, the implementation environment may include a terminal 120 and a server 140. Both the terminal 120 and the server 140 may be referred to as an electronic device.

The terminal 120 is configured to perform face image transmission. The terminal 120 may include a camera component 122 and a host 124. The camera component 122 is configured to transmit a target face image to the server 140 and receive a face image identification (FACE_KEY) returned by the server 140. The camera component 122 transmits the face image identification to the host 124. The host 124 transmits the face image identification and a user identification to the server 140, so that the server 140 can query a corresponding target face image based on the face image identification and query a corresponding standard image based on the user identification, to complete face recognition based on the standard image and the target face image and perform service operations such as account login and value transfer after the face recognition is successful.

In some embodiments, the camera component 122 may include a sensor 1222 and a first processor 1224, and the first processor 1224 may include a security module 1226 and a network module 1228. In some embodiments, the camera component 122 may be a 3 Dimensions (3D) camera component. The 3D camera component may have functions such as face recognition, gesture recognition, human skeleton recognition, 3D measurement, environment perception, or 3D map reconstruction. Information about distance between each pixel in an acquired image and a camera can be detected by using the 3D camera component, so that whether a user corresponding to a currently acquired face image is a living body can be determined to prevent attackers from using other people's photos to perform identity verification to steal other people's funds for value transfer.

The sensor 1222 is configured to acquire face images. The sensor 1222 may be disposed inside the camera component 122. The sensor 1222 may be at least one of a color image sensor, a depth image sensor, or an infrared image sensor. Types of the sensor 1222 are not specifically limited in the embodiments of this application. Correspondingly, a face data stream acquired by the sensor 1222 may include at least one face image, and each face image may be at least one of a color image, a depth image, or an infrared image. Types of the face image are not specifically limited in the embodiments of this application.

The first processor 1224 may run in the TEE. The first processor 1224 may be configured to perform image screening on at least one face image in a face data stream acquired by the sensor 1222 to obtain at least one target face image. The first processor 1224 may be further configured to obtain a face image identification of the target face image from the server 140. For example, the first processor 1224 may be a digital signal processor (DSP). The DSP is a special microprocessor, which is a device that can process a large amount of information with digital signals. Certainly, the first processor 1224 may alternatively be in the hardware form of a field programmable gate array (FPGA) or a programmable logic array (PLA). The hardware form of the first processor 1224 is not specifically limited in the embodiments of this application.

In some embodiments, the first processor 1224 may include the security module 1226 and the network module 1228. The security module 1226 is configured to store a target key and a target web address. The target web address refers to a web address used for requesting a face image identification. The target key refers to an encryption key of a face image. That is, the security module 1226 is essentially a special, safe, and trusted memory. The security module 1226 may be at least one of the TEE element or the SE. The target key may be burned into the TEE element or SE chip when the camera component 122 leaves the factory.

In one embodiment of this application, an example in which the security module 1226 is built in the first processor 1224 of the camera component 122 is used for description. In this case, it can be considered that the first processor 1224 runs in the TEE. In some embodiments, the security module 1226 may be a memory independent of the first processor 1224 in the camera component 122. Whether the security module 1226 is built in the first processor 1224 is not specifically limited in the embodiments of this application.

In some embodiments, the host 124 may include a second processor 1242, and the second processor 1242 runs in the REE. Since the first processor 1224 runs in the TEE, the first processor 1224 and the second processor 1242 can achieve data isolation in a physical running environment. The first processor 1224 stores, processes, and protects a face data stream in an isolated and trusted TEE environment. In some embodiments, data may be transmitted between the first processor 1224 and the second processor 1242 based on an inter-process communication (IPC) mechanism.

The terminal 120 and the server 140 may be connected by a wired or wireless network.

The server 140 may include at least one of one server, a plurality of servers, a cloud computing platform, and a virtualization center. The server 140 is configured to provide a backend service for an APP running on the terminal 120. The APP may provide a user with a value transfer service, so that the user can perform a value transfer operation based on the terminal 120. In some embodiments, the server 140 may take on primary computing work, and the terminal 120 may take on secondary computing work; alternatively, the server 140 takes on secondary computing work, and the terminal 120 takes on primary computing work; alternatively, collaborative computing is performed by using a distributed computing architecture between the server 140 and the terminal 120.

In some embodiments, the server 140 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

In an exemplary scenario, the face data transmission process may occur in the process of value transfer based on face recognition. In this case, the terminal 120 may be commonly referred to as a "facial recognition payment terminal". The facial recognition payment terminal refers to an electronic device that integrates a camera and can acquire a face data stream of a user and then make a payment. A user may perform a trigger operation on a value transfer option on the terminal 120 to trigger the terminal 120 to invoke the camera component 122 to acquire a face data stream of the user in real time. Based on the method for transferring value provided by the embodiments of this application, the camera component 122 transmits a verification request to the server 140. The verification request carries at least one target face image. The entire camera component 122 is in the TEE state, so that it can ensure that the transmission of the target face image (that is, the transmission of the verification request) has high security and reliability, and there is no need to expose the target face image in the REE, which avoids frequent network attacks in the REE. After verification of the verification request by the server 140 is successful, the server 140 returns a verification success response to the camera component 122, and the verification success response carries at least one face image identification. Further, the camera component 122 transmits the face image identification to the host 124, and the host 124 transmits a value transfer request to the server 140. The value transfer request carries value transfer information, a user identification, and the at least one face image identification, so that the server 140 can find a corresponding target face image according to the at least one face image identification, find a corresponding standard image according to the user identification, and perform face recognition based on the target face image and the standard image. After the face recognition is successful, a value transfer operation is performed based on value transfer information. The value transfer information may include a user identification, a target user identification, and a value that is to be transferred. In this case, although the host 124 is in the REE state, the host 124 does not need to transmit the target face image, but transmits the face image identification, so that the security of the face image transmission process can be greatly ensured.

The user and the target user are only distinguished names for users with different identities in a certain process of value transfer. In some value transfer processes, a certain user may be both a user and a target user, that is, the user transfers a value from an account to another account both owned by himself/herself. Certainly, a certain user may be as a user in a value transfer process and as a target user in another value transfer process.

Figure 2:
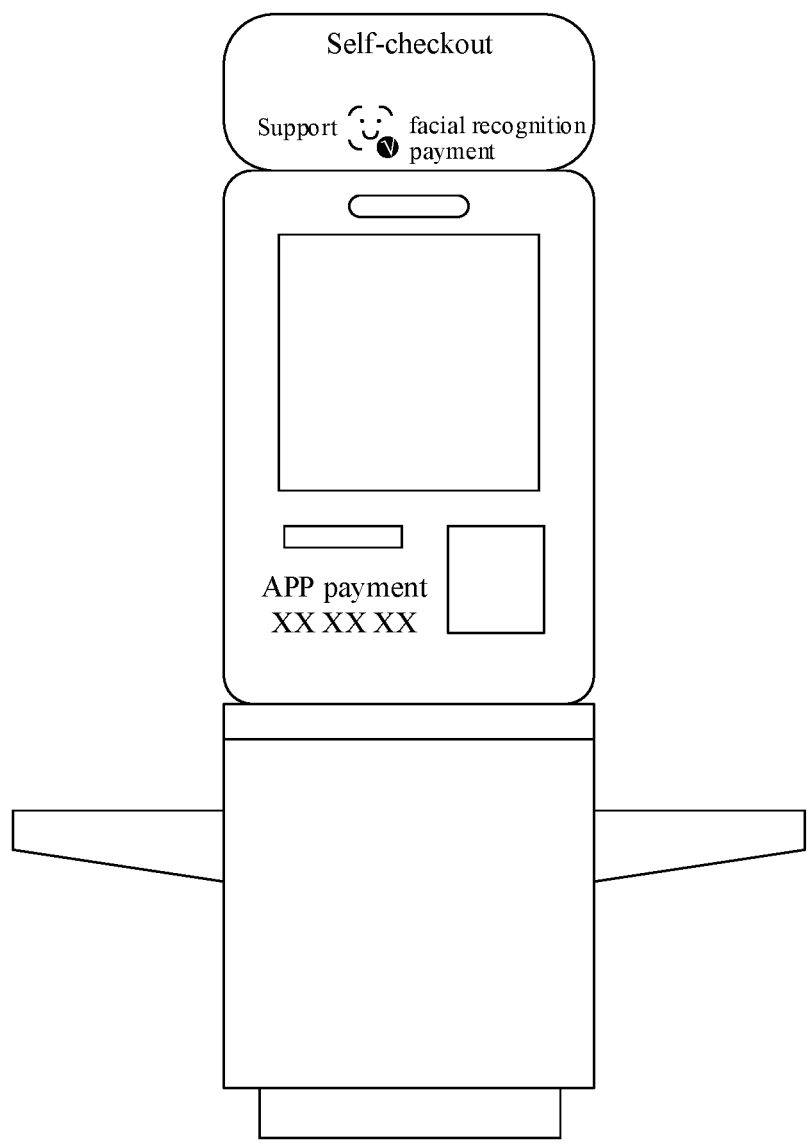
FIG. 2 is a schematic diagram of an appearance of a terminal 120 according to an embodiment of this application.

FIG. 2 is a schematic diagram of an appearance of a terminal 120 according to an embodiment of this application. Referring to FIG. 2, the terminal 120 may have a display screen, and a user performs an interaction operation based on the display screen, thereby completing a value transfer operation based on face recognition. In some embodiments, a device type of the terminal 120 may include at least one of a smartphone, a tablet computer, an e-book reader, a Moving Picture Experts Group Audio Layer III (MP3) player, a Moving Picture Experts Group Audio Layer IV (MP4) player, a laptop computer, and a desktop computer.

In some embodiments, there may be more or fewer terminals 120. For example, there may be only one terminal 120, or there may be dozens of or hundreds of terminals 120 or more. The quantity and the device type of the terminal 120 are not limited in the embodiments of this application.

Figure 3:
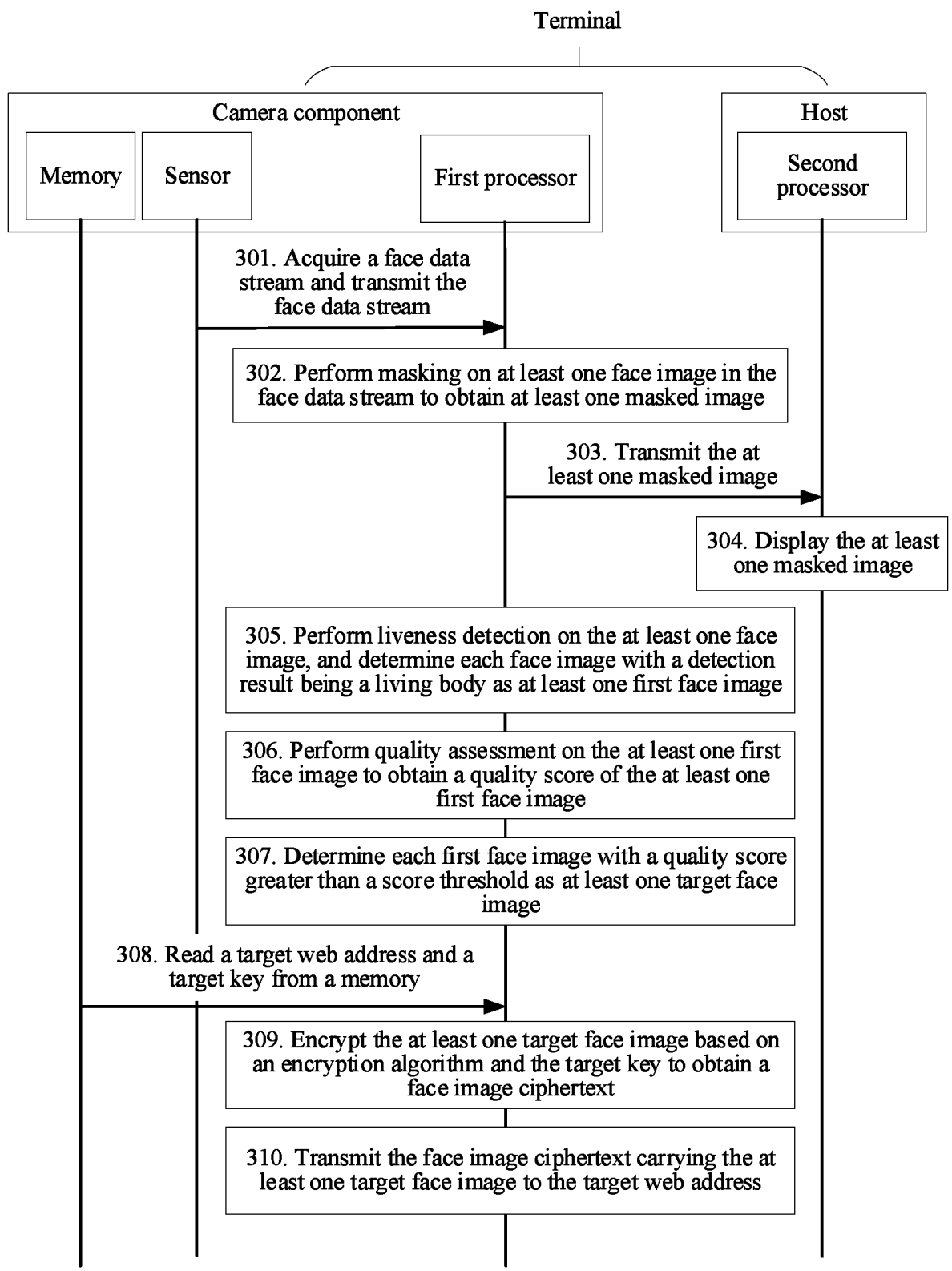
FIG. 3 is an interaction flowchart of a method for transmitting face image data according to an embodiment of this application.

FIG. 3 is an interaction flowchart of a method for transmitting face image data according to an embodiment of this application. Referring to FIG. 3, this embodiment may be applied to the terminal 120 in the foregoing implementation environment, specifically including the interaction process between the camera component 122 and the host 124. This embodiment includes the following steps:

301. A camera component of a terminal acquires a face data stream based on a sensor, and transmits the face data stream to a first processor by the sensor.

The terminal is configured to perform face image transmission. The terminal may include the camera component and the host. The camera component runs in the TEE, and the host runs in the REE. In some embodiments, the camera component may be a 3D camera component, so that the camera component can detect information about distance between each pixel in an acquired image and a camera to determine whether a user corresponding to a currently acquired face image is a living body to prevent attackers from using other people's photos to perform identity verification to steal other people's funds for value transfer.

In some embodiments, the camera component may include a sensor, a first processor, and a memory. The memory is a security module in the foregoing implementation environment. The memory is at least one of a TEE element or an SE. The memory may be built in the first processor, or may be independent of the first processor. Whether the memory is built in the first processor is not specifically limited in the embodiments of this application. In some embodiments, the memory is configured to store a target key and a target web address. The target web address refers to a web address used for requesting a face image identification. The target key refers to an encryption key of a face image. The target key may be burned into the TEE element or SE chip when the camera component leaves the factory.

In some embodiments, the host may include a second processor, and the second processor runs in the REE. Since the first processor runs in the TEE, the first processor and the second processor can achieve data isolation in a physical running environment. The first processor stores, processes, and protects a face data stream in an isolated and trusted TEE environment. In some embodiments, data may be transmitted between the first processor and the second processor based on an IPC mechanism.

In step 301, the second processor of the host may run a terminal operating system, the terminal operating system delivers an acquisition instruction to the camera component based on the IPC mechanism, the camera component creates a shooting process in response to the acquisition instruction, the shooting process may invoke the sensor of the camera component to acquire the face data stream, the face data stream may include at least one face image, and the sensor may transmit the acquired face data stream to the first processor in real time, to perform the following step 302.

In some embodiments, different types of sensors may acquire different types of face images. For example, the face image acquired by an infrared image sensor is an infrared image, the face image acquired by a depth image sensor is a depth image, and the face image acquired by a color image sensor is a color image. Types of the sensor and the face image are not specifically limited in the embodiments of this application.

302. The camera component of the terminal performs masking on at least one face image in the face data stream by the first processor to obtain at least one masked image.

The foregoing process of data masking of the face image, also referred to as the process of data obfuscation, data deprivation, or data deformation, refers to the deformation of certain sensitive privacy data (specifically, a facial feature region of the face image in one embodiment of this application) based on a masking rule to achieve reliable protection of sensitive privacy data.

In some embodiments, the first processor may perform masking in the following manners. The camera component of the terminal performs face detection on the at least one face image by the first processor, and determines a facial feature region in the at least one face image; and the camera component of the terminal performs image enhancement on the facial feature region in the at least one face image by the first processor to obtain the at least one masked image.

In some embodiments, the image enhancement may include at least one of grayscale transformation enhancement, histogram enhancement, image smoothing, image sharpening, frequency domain enhancement, or color enhancement. For example, the grayscale transformation enhancement may include at least one of linear grayscale enhancement, piecewise linear grayscale enhancement, or nonlinear grayscale enhancement; the histogram enhancement may include at least one of histogram equalization or histogram specification; the image smoothing may include linear filtering methods such as mean filtering and Gaussian filtering, and may also include nonlinear filtering methods such as median filtering and bilateral filtering; the image sharpening may use different convolution operators, such as a Robert operator, a Sobel operator, a Laplace operator, and a Canny operator; the frequency domain enhancement may include at least one of low-pass filtering, high-pass filtering, band-stop filtering, or homomorphic filtering; and the color enhancement may include at least one of true color enhancement, false color enhancement, or pseudo color enhancement.

In the foregoing process, the first processor only performs image enhancement (that is, noise enhancement) on the facial feature region by recognizing the facial feature region of the face image to obtain the masked image, which can reduce the calculation amount of the masking process. This masked image is essentially obtained by performing data deformation on an original facial feature region of the face image, so that when the masked image is subsequently transmitted to the second processor running in the REE, since the masked image is a face image after noise enhancement on the facial feature region, even if there is a leak in the REE, the leaked masked image cannot be used for face recognition, thereby improving the security of the face data transmission process.

In some embodiments, the first processor may not recognize the facial feature region of the face image, but may perform image enhancement on the entire face image to obtain the masked image, thereby simplifying the masking process.

303. The camera component of the terminal transmits the at least one masked image to a second processor of the terminal by the first processor, the second processor running in an REE.

The second processor is deployed on a host side of the terminal. Since the host runs in the REE, the second processor also runs in the REE.

In the foregoing process, the first processor may transmit the at least one masked image to the second processor based on the IPC mechanism. For example, the first processor transmits the at least one masked image to the second processor through a local socket interface. Certainly, the masked image may alternatively be transmitted between the first processor and the second processor through message queues, shared memory, Unix domain protocols, or pipes. The transmission method of the masked image is not specifically limited in the embodiments of this application.

304. A host of the terminal displays the at least one masked image on the terminal by the second processor.

In the foregoing process, after receiving the at least one masked image transmitted by the first processor through the second processor, the host of the terminal may invoke a graphics processing unit (GPU) to render the at least one masked image to display the at least one masked image on a display screen of the terminal, thereby facilitating the user to preview the masked image on the display screen. In this case, although the host side still has a great security risk, because the host side only obtains the masked image, and sensitive privacy data of the face image is protected in the masked image through image noise enhancement, even if an attacker initiates a network attack and intercepts the masked image stored on the host side, it is still unable to perform face recognition in a fraudulent manner, thereby improving the security of the face data transmission process.

305. The camera component of the terminal performs liveness detection on the at least one face image by the first processor, and determines each face image with a detection result being a living body as at least one first face image.

In the foregoing process, the first processor may store a liveness detection algorithm, and therefore can perform liveness detection on the at least one face image based on the liveness detection algorithm, determine the detection result of the at least one face image, and determine each face image with the detection result being a living body as the at least one first face image.

In some embodiments, when each face image is a depth image, the first processor may read information about distance between each pixel and a camera in the depth image. If a difference of the distance information is less than a target threshold, it indicates that the face image is a photo, and the detection result being not a living body is outputted. Otherwise, it indicates that the face image is not a photo, and the detection result being a living body is outputted.

In some embodiments, the first processor may store a liveness detection model, the at least one face image is inputted to the liveness detection model, convolution processing is performed on the at least one face image through the liveness detection model, and the detection result of the at least one face image is outputted. In some embodiments, the liveness detection model may be a binary classification model such as convolutional neural networks (CNNs) and deep neural networks (DNNs). Types of the liveness detection model are not specifically limited in the embodiments of this application.

In some embodiments, the liveness detection algorithm may further include at least one of dynamic liveness detection, static liveness detection, infrared liveness detection, or optical flow. Types of the liveness detection algorithm are not specifically limited in the embodiments of this application.

In the foregoing process, liveness detection is performed on each face image in the face data stream by the first processor, and preliminary screening can be performed on the face data stream to screen out the first face image with the detection result being a living body, which can resist face attacks of forged photos and improve the security of the face data transmission process.

In some embodiments, the camera component may directly determine the at least one first face image as at least one target face image, that is, determine each face image with the detection result being a living body as the at least one target face image, thereby simplifying the image screening process and reducing the calculation amount in the image screening process.

In some embodiments, secondary screening may further be performed on the at least one first face image based on quality assessment, referring to the following steps 306 and 307, to obtain the at least one target face image, so that more in-depth image screening can be performed on the face data stream to avoid transmitting some low-quality face images to the server, and avoid wasting the system bandwidth in the data transmission process.

306. The camera component of the terminal performs quality assessment on the at least one first face image by the first processor to obtain a quality score of the at least one first face image.

In the foregoing process, the first processor may store a quality assessment algorithm, and therefore can perform quality assessment on the at least one first face image based on the quality assessment algorithm to obtain the quality score of the at least one first face image.

In some embodiments, the first processor may use objective indicators such as a structural similarity index (SSIM) or a peak signal to noise ratio (PSNR) to assess the quality score of the image, so that the quality score of each first face image can be conveniently and quickly obtained.

In some embodiments, the first processor may store a quality assessment model, the at least one first face image is inputted to the quality assessment model, convolution processing is performed on the at least one first face image through the quality assessment model, and the quality score of the at least one first face image is outputted. In some embodiments, the quality assessment model may be support vector machine (SVM), support vector regression (SVR), SVM+ SVR model, CNN, or DNN. Types of the quality assessment model are not specifically limited in the embodiments of this application.

In the foregoing process, quality assessment is performed on each first face image after preliminary screening by the first processor, and secondary screening can be performed on each second face image, so that each first face image with the quality score greater than a score threshold may be determined as the at least one target face image in the following step 307, thereby avoiding transmitting some low-quality face images to the server, and avoiding wasting the system bandwidth in the data transmission process.

In some embodiments, the camera component may not perform step 305, but directly perform quality assessment on the at least one face image after performing step 304, to obtain the quality score of the at least one face image, and determine each face image with the quality score greater than the score threshold as the at least one target face image, thereby simplifying the image screening process and reducing the calculation amount in the image screening process.

307. The camera component of the terminal determines each first face image with a quality score greater than a score threshold as at least one target face image by the first processor.

The score threshold is any value greater than or equal to 0.

In some embodiments, the first processor may sort the first face images in descending order of the quality scores, and determine the first face image at a front target position as the target face image, so that the quantity of the target face images transmitted each time can be flexibly controlled. The target position is any integer greater than or equal to 1.

In some embodiments, the first processor may sort the first face images in descending order of the quality scores, and determine the first face image at a front target ratio as the target face image, so that the ratio of the target face images transmitted each time can be flexibly controlled. The target ratio is any value greater than or equal to 0 and less than or equal to 1.

In the foregoing process, based on a threshold screening strategy, the first processor ensures that the target face image is not only a face image with the detection result being a living body, but also a face image with the quality score greater than the score threshold. This is because some face images with low quality scores are usually face images with high blurriness. These face images cannot be used for face recognition. Therefore, filtering out these face images with low quality scores can save the system bandwidth in the data transmission process.

In some embodiments, the first processor may first perform quality assessment on each face image to obtain at least one first face image with a quality score greater than a score threshold, and then perform liveness detection on the at least one first face image to obtain at least one target face image with a detection result being a living body. A performing order of quality assessment and liveness detection is not specifically limited in the embodiments of this application. Alternatively, as mentioned above, the first processor may only perform liveness detection or only perform quality assessment without secondary screening, thereby reducing the calculation amount in the image screening process.

In the steps 305 to 307, image screening is performed on at least one face image in the face data stream by the first processor to obtain at least one target face image, the at least one target face image meeting a target condition. The target condition may be that, for each target face image, the detection result is a living body and the quality score is greater than the score threshold, or the target condition may be that the detection result of each target face image is a living body (in this case, only liveness detection is performed), or the target condition may be that the quality score of each target face image is greater than the score threshold (in this case, only quality assessment is performed).

308. The camera component of the terminal reads a target web address and a target key from a memory by the first processor.

In the foregoing process, the memory is also a security module, and the memory is at least one of the TEE element or the SE and is configured to store the target web address and the target key. The target web address refers to a web address used for requesting a face image identification. For example, the target web address is a uniform resource locator (URL). The target key refers to an encryption key of a face image.

The target key may have different types according to different encryption algorithms. When the encryption algorithm is a symmetric encryption algorithm, a decryption key stored on the server side is the same as the target key, and both the encryption algorithm and the decryption algorithm use the target key for encryption or decryption. For example, the target key may be an advanced encryption standard (AES) key.

In some embodiments, when the encryption algorithm is an asymmetric encryption algorithm, the target key usually includes a public key of the camera component and a private key of the camera component. In the process of data transmission between the camera component of the terminal and the server, the camera component and the server exchange their respective public keys. The camera component also stores the public key provided by the server in the memory, so that when subsequent data is transmitted to the server, encryption may be performed by using the public key provided by the server, and the server may perform decryption based on its own private key. Similarly, when the server returns data to the camera component, encryption may be performed by using the public key of the camera component, and the camera component may perform decryption based on its own private key. Types of the target key are not specifically limited in the embodiments of this application.

309. The camera component of the terminal encrypts the at least one target face image based on an encryption algorithm and the target key by the first processor to obtain a face image ciphertext.

In the foregoing process, the encryption algorithm used by the first processor may be an encryption function. The first processor uses the target key and the at least one target face image as an input of the encryption function to determine an output of the encryption function as the face image ciphertext.

In some embodiments, the first processor may first compress the at least one target face image to obtain a compressed message, so that the target key and the compressed message are used as an input of the encryption function to determine an output of the encryption function as the face image ciphertext.

In the foregoing process, each target face image is encrypted by the first processor. On the one hand, the target key is stored in the TEE element or the SE, so that the security of the target key can be ensured, preventing the face image from being intercepted due to the theft of the target key. On the other hand, the first processor runs in the TEE, and this execution environment that has a small amount of code and high security and is closed (isolated from the REE) can further improve the security of the face image transmission process.

310. The camera component of the terminal transmits the face image ciphertext carrying the at least one target face image to the target web address by the first processor.

In the steps 308 to 310, the at least one target face image is transmitted to the target web address by the first processor. Since the first processor runs in the TEE, the transmission of the target face image does not need to pass through the REE hardware resources (such as the second processor), avoiding the problem of the target face image being stolen due to poor REE security, and improving the security of the face image transmission process.

In some embodiments, after receiving the face image ciphertext, the server may decrypt the face image ciphertext to obtain the at least one target face image, and then perform validity verification on the at least one target face image.

When the verification is successful, the server transmits at least one face image identification to the first processor of the camera component of the terminal, and the terminal receives the at least one face image identification by the first processor. One face image identification is used for uniquely identifying one target face image in the at least one target face image. The terminal transmits the at least one face image identification to the second processor of the terminal by the first processor. The terminal transmits a user identification and the at least one face image identification to the server by the second processor, so that the server can perform subsequent service operations based on the user identification and the at least one face image identification. The specific process is described in detail in the following embodiment, and details are not described herein.

Any combination of the foregoing optional technical solutions may be used to form an optional embodiment of this application. Details are not described herein again.

In the method provided by one embodiment of this application, a sensor, a first processor, and a memory are deployed in a camera component of a terminal. The memory is at least one of the TEE element or the SE. A face data stream is acquired using the sensor. The face data stream is transmitted to the first processor by the sensor. Image screening is performed on at least one face image in the face data stream by the first processor to obtain at least one target face image. The at least one target face image meets a target condition. A target web address is read from the memory by the first processor. The at least one target face image is transmitted to the target web address by the first processor. Since the memory is at least one of the TEE element or the SE, the camera component runs in the TEE, so that the transmission of the target face image does not need to pass through the REE hardware resources, avoiding the problem of the target face image being stolen due to poor REE security, and improving the security of the face image transmission process.

The method for transmitting face image data provided by the foregoing embodiment can ensure that the camera component runs in the REE, and the camera component directly performs face image transmission by the first processor without passing through any REE hardware resources of the host side. Each user does not need to perform hardware upgrade or system transformation on the host of the terminal, and there is no mandatory requirement for the configuration of the host. Each user only needs to access the camera component provided by one embodiment of this application to ensure the security of the face data source, which greatly reduces the difficulty for maintaining the security of the face data source, and has high portability and usability. The method for transmitting face image data may be applied to various service scenarios that rely on face images. In an embodiment of this application, the process of performing identity verification based on a face image to complete a value transfer service is used as an example. The process may be referred to as a face payment scenario or a facial recognition payment scenario, which is described in detail below.

Figure 4:
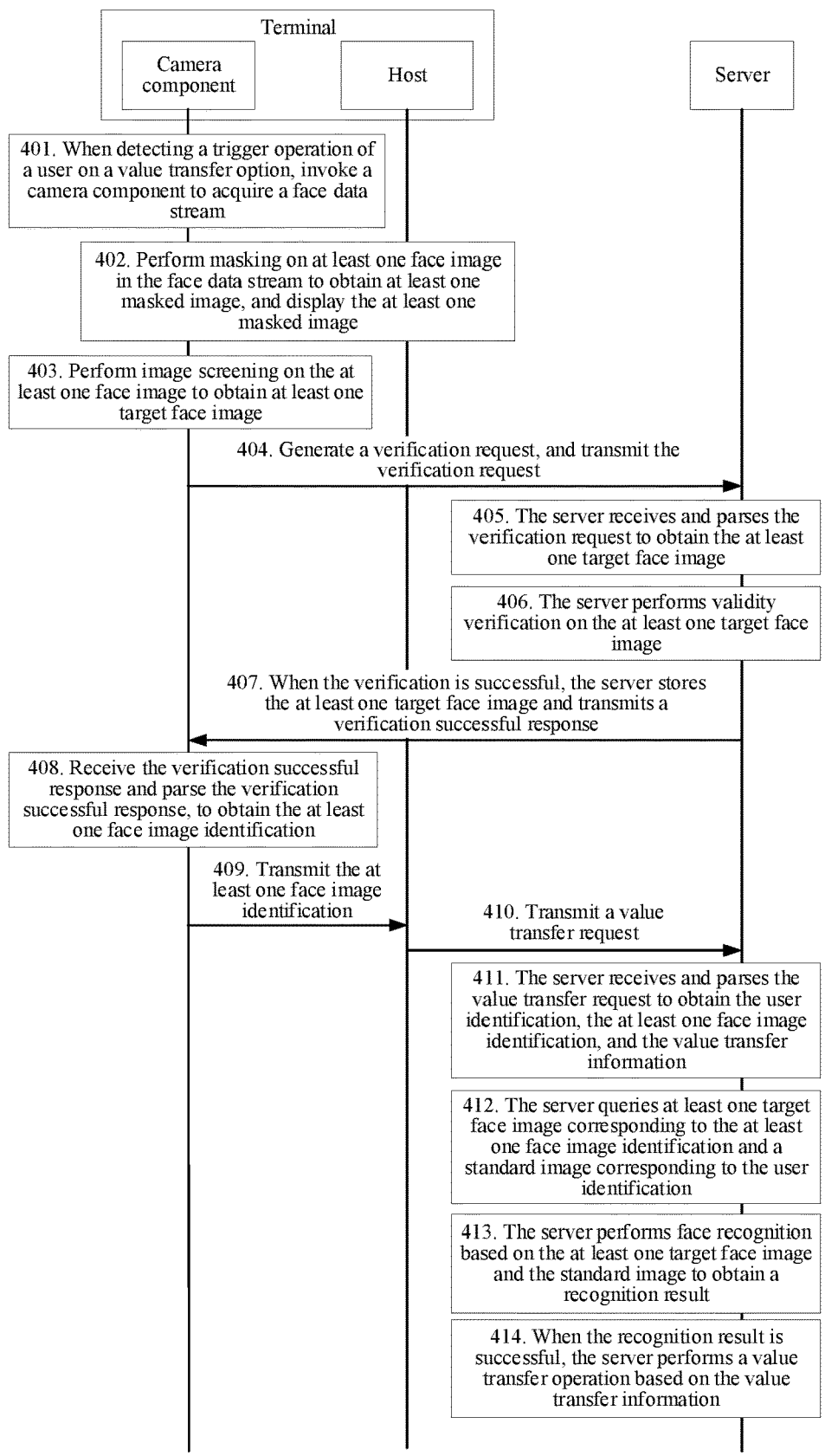
FIG. 4 is an interaction flowchart of a method for transferring value according to an embodiment of this application.

FIG. 4 is an interaction flowchart of a method for transferring value according to an embodiment of this application. Referring to FIG. 4, this embodiment is applied to the interaction process between the terminal 120 and the server 140 in the foregoing implementation environment. This embodiment includes the following steps:

401. When detecting a trigger operation of a user on a value transfer option, a terminal invokes a camera component to acquire a face data stream.

In the foregoing process, the terminal includes the camera component and a host, the camera component includes a sensor, a first processor, and a memory, the memory is at least one of the TEE element and the SE, the camera component runs in the TEE, the host includes a second processor, and the host runs in the REE. The terminal may be a personal terminal of a user, or may be a "facial recognition payment terminal" set in a store where a target user is located. The facial recognition payment terminal refers to an electronic device that integrates a camera and can acquire a face image of the user and then make a payment. Device types of the terminal are not limited in the embodiments of this application.

The user and the target user are only distinguished names for users with different identities in a certain process of value transfer. In some value transfer processes, a certain user may be both a user and a target user, that is, the user transfers a value from an account to another account both owned by himself/herself. Certainly, a certain user may be as a user in a value transfer process and as a target user in another value transfer process.

In step 401, when value transfer needs to be performed, the user triggers the terminal to display a payment interface on a display screen. The payment interface may include value transfer information and a value transfer option. After checking the value transfer information, the user may perform the trigger operation on the value transfer option. When the trigger operation of the user on the value transfer option is detected, since the second processor of the host of the terminal runs a terminal operating system, the terminal operating system may deliver an acquisition instruction to the camera component based on an IPC mechanism, the camera component creates a shooting process in response to the acquisition instruction, and the shooting process may invoke the sensor of the camera component to acquire the face data stream.

In some embodiments, the value transfer information may include at least a user identification, a target user identification, and a value that is to be transferred. Certainly, the value transfer information may further include transaction item information, discount information, transaction timestamp, and the like.

402. The terminal performs masking on at least one face image in the face data stream to obtain at least one masked image, and displays the at least one masked image.

The step 402 is similar to the steps 302 to 304. Details are not described herein again.

403. The terminal performs image screening on the at least one face image to obtain at least one target face image, the at least one target face image meeting a target condition.

Step 403 is similar to steps 305 to 307. Details are not described herein again.

404. The terminal generates a verification request, and transmits the verification request to a server by the camera component, the verification request carrying the at least one target face image.

The terminal may compress the at least one target face image to obtain a compressed message, encrypt the compressed message based on an encryption algorithm and a target key to obtain a face image ciphertext, and encapsulate the face image ciphertext based on a transmission protocol to obtain the verification request. In some embodiments, the transmission protocol may include at least one of an Internet Protocol (IP), a transmission control protocol (TCP), or a user datagram protocol (UDP). Types of the transmission protocol are not limited in the embodiments of this application.

The target web address is an IP address of the server. The target key is a key agreed upon between the terminal and the server. The target web address and the target key are both stored in the memory (the security module) of the camera component.

The step 404 is similar to the steps 308 to 310. Details are not described herein again.

405. The server receives and parses the verification request to obtain the at least one target face image.

In the foregoing process, after receiving the verification request, the server may parse the verification request to obtain the face image ciphertext, decrypt the face image ciphertext based on a decryption algorithm and a decryption key to obtain a compressed message, and decompress the compressed message to obtain the at least one target face image.

The decryption key may have different types according to different decryption algorithms. When the encryption algorithm is a symmetric encryption algorithm, the decryption key stored on the server side is the same as the target key on the terminal side, and both the encryption algorithm and the decryption algorithm use the same key for encryption or decryption. For example, the decryption key (or the target key) may be an AES key.

In some embodiments, when the encryption algorithm is an asymmetric encryption algorithm, the decryption key usually includes a public key of the server and a private key of the server. In the process of data transmission between the terminal and the server, the terminal exchanges public keys with the server by the camera component. The server stores the public key provided by the camera component, so that the terminal may encrypt the verification request by using the public key of the server, and the server decrypts the verification request by using its own private key. In addition, when the server needs to return a verification success response to the terminal, the server may encrypt the verification success response by using the public key provided by the camera component, and the terminal decrypts the verification success response by using its own private key. Types of the target key are not limited in the embodiments of this application.

406. The server performs validity verification on the at least one target face image.

In some embodiments, in the process of the validity verification, the server may verify whether each difference between a shooting timestamp of the at least one target face image and the current time is less than or equal to a time difference threshold. If each difference is less than or equal to the time difference threshold, it is determined that the verification of the at least one target face image is successful. Otherwise, it is determined that the at least one target face image fails the verification, indicating that there is a replay attack image in the at least one target face image. The replay attack image refers to a historical face image stolen by an attacker.

In some embodiments, in the process of the validity verification, the first processor may add a blind watermark to each target face image. The blind watermark can uniquely identify which image of each target face image captured by the camera component is. The blind watermark can keep increasing with time. The server verifies whether the blind watermarks in the target face images are more than stored historical blind watermarks. If the blind watermarks in the target face images are more than the stored historical blind watermarks, it is determined that the verification of the at least one target face image is successful. Otherwise, it is determined that the at least one target face image fails the verification, indicating that there is a replay attack image in the at least one target face image.

In the foregoing process, whether the verification is based on the shooting timestamp or based on the blind watermark, whether each target face image is a replay attack image can be verified, which can greatly improve the security of the face data transmission process, and ensure the security of the value transfer process based on the face image transmission.

407. When the verification is successful, the server stores the at least one target face image and transmits a verification success response to the terminal, the verification success response carrying at least one face image identification.

One face image identification is used for uniquely identifying one target face image in the at least one target face image.

In the foregoing process, if the validity verification is successful, the server may assign a face image identification to each target face image. The face image identification may be referred to as "FACE_KEY". The face image identification can uniquely determine a stored target face image.

408. When verification of the verification request by the server is successful, the terminal receives the verification success response by the camera component and parses the verification success response, to obtain the at least one face image identification.

In some embodiments, the server may encrypt the verification success response, and the terminal decrypts the verification success response to obtain the at least one face image identification, which can ensure the security of the face image identification transmission process, and ensure the security of the value transfer process based on the face image transmission.

In the foregoing process, when the encryption algorithm is a symmetric encryption algorithm, the used encryption key is the same as the target key stored by the camera component of the terminal, and when the encryption algorithm is an asymmetric encryption algorithm, the used encryption key may be the public key of the camera component obtained by exchanging with the camera component.

409. The terminal transmits the at least one face image identification to a host by the camera component.

In the foregoing process, the camera component may transmit at least one face image identification to the host based on an IPC mechanism. The IPC mechanism may include at least one of a local socket interface, a message queue, shared memory, a Unix domain protocol, or a pipe. The transmission method of the face image identification is not specifically limited in the embodiments of this application.

410. The terminal transmits a value transfer request to the server by the host, the value transfer request carrying a user identification, the at least one face image identification, and value transfer information.

In some embodiments, the user identification is used for uniquely identifying one user, and the user identification may be at least one of a user mobile phone number, an ID number, an identification code, or an email address.

In the foregoing process, the host runs in the REE. Due to the poor security of the REE, the host does not need to transmit the target face image to the server, but transmits the face image identification (FACE_KEY) to the server. In this case, even if the face image identification is stolen, the target face image cannot be replaced, and the funds of others cannot be stolen based on the face replay attack. Further, the server performs the value transfer operation based on the value transfer request, which ensures the security of the value transfer process.

411. The server receives and parses the value transfer request to obtain the user identification, the at least one face image identification, and the value transfer information.

The step 411 is similar to the step 405, and details are not described herein again.

412. The server queries at least one target face image corresponding to the at least one face image identification and a standard image corresponding to the user identification.

In the foregoing process, the at least one target face image is stored after the validity verification is successful in the step 407, and is safely transmitted by the terminal to the server through the camera component running in the TEE. Therefore, the security of the at least one target face image is greatly ensured.

According to the at least one face image identification, the server can quickly find at least one target face image corresponding to the at least one face image identification. Specifically, the server may store the target face image in the form of a key-value pair. That is, each face image identification corresponding to each target face image is used as a key name (FACE_KEY), and each target face image is used as a key value (FACE_VALUE), so that at least one face image identification is used as at least one key name, at least one key value stored in a database corresponding to the at least one key name is queried, and the at least one key value is obtained as at least one target face image.

Similarly, the server can quickly find a standard image corresponding to the user identification according to the user identification. The standard image refers to a user image used for face similarity comparison. For example, the standard image may be a photo of an ID card uploaded by the user, or the standard image may be a life photo, an art photo, or the like uploaded by the user. Specifically, the server may store the standard image in the form of a key-value pair. That is, the user identification corresponding to each user is used as a key name, and the standard image corresponding to each user is used as a key value, so that the key value stored in a database corresponding to the key name is queried according to the user identification as the key name, and the key value is obtained as the standard image.

413. The server performs face recognition based on the at least one target face image and the standard image to obtain a recognition result.

In the process of face recognition, the server may input the at least one target face image and the standard image into a face similarity model, and predict separately predict at least one similarity between the at least one target face image and the standard image by using the face similarity model. If an average value of the at least one similarity is greater than or equal to a target threshold, it is determined that the recognition result of the face image is successful, and the following step 414 is performed. Otherwise, if the similarity is less than the target threshold, it is determined that the recognition result of the face image is not successful, and the server may transmit a verification failure response to the terminal. The target threshold is any value greater than 0.

414. When the recognition result is successful, the server performs a value transfer operation based on the value transfer information.

The value transfer information may include a user identification, a target user identification, and a value that is to be transferred.

When the recognition result is successful, the server may transfer the value that is to be transferred from the value stored corresponding to the user identification to the value stored corresponding to the target user. In some embodiments, when the value transfer is completed, the server may further transmit transfer success information to the terminal to notify the terminal that the value transfer operation has been successfully performed.

Any combination of the foregoing optional technical solutions may be used to form an optional embodiment of this application. Details are not described herein again.

In the method provided by one embodiment of this application, a verification request is transmitted to the server by the camera component running in the TEE, and the verification request carries at least one target face image. When verification of the verification request by the server is successful, a verification success response is received through the camera component, and the verification success response carries at least one face image identification. The at least one face image identification is transmitted to the host by the camera component. A value transfer request is transmitted to the server by the host, the server performs a value transfer operation based on the value transfer request, and the value transfer request carries a user identification, the at least one face image identification, and value transfer information. Since the camera component runs in the TEE, the data exchange between the camera component and the server does not need to pass through the REE hardware resource, which ensures that the data exchange between the camera component and the server is safe and reliable. After obtaining the face image identification, the camera component transmits the face image identification to the host running in the REE. The host transmits the value transfer request carrying the face image identification to the server. Since the value transfer request carries the face image identification instead of the target face image, even if the host on the REE side suffers a network attack, the target face image will not be leaked, which can effectively ensure the security of the overall value transfer process. Further, the camera component may also transmit a masked image, that is, a face image after masking, to the host. The host may display the masked image in real time, so that the user may preview the masked image based on the host. Because a sensitive facial feature region has been masked in the masked image, even if the host suffers a network attack and causes data leakage, the leaked masked image cannot be used for face recognition, which can prevent an attacker from launching a face replay attack and improve the security of the value transfer process.

On the server side, a value transfer request is received, the value transfer request carries a user identification, at least one face image identification, and value transfer information, at least one target face image corresponding to the at least one face image identification and a standard image corresponding to the user identification are queried, and face recognition is performed based on the at least one target face image and the standard image, to obtain a recognition result. When the recognition result is successful, a value transfer operation is performed based on the value transfer information. The value transfer request received by the server from the host running in the REE carries the face image identification instead of the target face image, so that even if a network attack occurs in a communication link, the target face image will not be leaked, which can effectively ensure the security of the overall value transfer process. Further, when the server receives the verification request carrying at least one target face image, if the verification request is successful, a face image identification is assigned to each target face image, and each target face image and each face image identification are stored correspondingly, which can query a corresponding target face image according to a corresponding store relationship when the value transfer request is subsequently received, facilitating the process of querying the target face image and improving the efficiency of querying the target face image.

Figure 5:
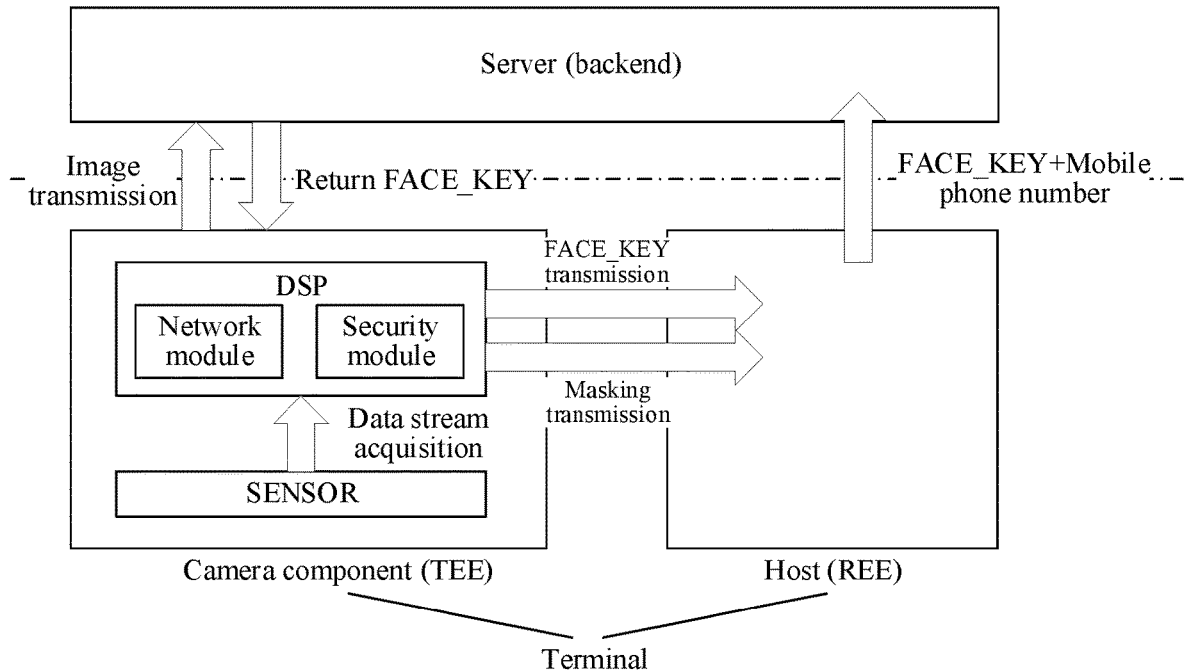
FIG. 5 is a schematic diagram of a method for transferring value according to an embodiment of this application.

In an exemplary scenario, FIG. 5 is a schematic diagram of a method for transferring value according to an embodiment of this application. Referring to FIG. 5, with the popularity of face payment, more and more merchants have access to face payment services. With the sudden increase in the quantity of users, the security of face payment becomes more and more important. In the method for transferring value provided by one embodiment of this application, the internal improvement of a camera component of a facial recognition payment terminal can add a security precaution to the camera component that acquires a face data source without the need to perform hardware upgrade on the host side, which strictly ensures the security of the face data source and can effectively resist the "replay attack" of the face data. Specifically, the terminal includes the camera component and the host, the camera component runs in the TEE, the host runs in the REE, a sensor (SENSOR) and a first processor (DSP) are configured in the camera component, the DSP is configured to perform face algorithm calculation, the face algorithm may include a face liveness detection algorithm and a quality assessment algorithm, a network module and a security module may also be built in the DSP, the network module is configured to transmit face image data (a target face image) to a server (that is, a server backend, referred to as a backend below) in exchange for a face image identification (FACE_KEY), FACE_KEY refers to an identification that uniquely identifies the face image data issued by the backend after the face image data is uploaded to the backend, the security module may be at least one of the TEE element or the SE, the security module is configured to store a key (a target key) for signing the content of a network request and a target web address (URL) for requesting the backend, and the target key may be burned into the security module when the camera component leaves the factory, for example, the target key may be an AES key, to ensure that the request content authenticated by the backend is credible.

Based on the above, the user triggers a value transfer option on the terminal, the terminal invokes the SENSOR of the camera component to acquire a face data stream, the SENSOR transmits the acquired face data stream to the DSP in real time, the DSP performs masking on the face data stream, specifically the DSP may perform noise enhancement on facial feature data (perform image enhancement on a facial feature region of any face image), to obtain at least one masked image, the DSP transmits the at least one masked image to the host running in the REE, the host displays the at least one masked image, and the user may preview the at least one masked image. In this case, because the face data stream has been masked, even if it is leaked, it cannot be used for face recognition, ensuring the security of the face data transmission process.

An example in which the target key is the AES key is used for description. The DSP performs selection and liveness detection on the face data stream based on the face algorithm, for example, the face algorithm includes the quality assessment algorithm and the liveness detection algorithm. A face image with a higher quality score is selected based on the quality assessment algorithm. A face image with a detection result being a living body is determined based on the liveness detection algorithm. After double screening, at least one target face image that meets a target condition may be selected. The at least one target face image is encrypted by using the preset AES key to obtain a face image ciphertext. The face image ciphertext is encapsulated into a verification request. The verification request is transmitted to the URL stored in the security module to transmit the verification request to the backend. After the backend receives the verification request, decryption is performed by using the AES key of the backend to obtain at least one target face image. In a case of verifying whether the at least one target face image is valid, each FACE_KEY that uniquely matches each target face image is returned to the DSP. After the DSP obtains each FACE_KEY, each FACE_KEY is transmitted to the host running in the REE. After receiving each FACE_KEY, the host encapsulates value transfer information, a user mobile phone number (a user identification), and each FACE_KEY into a value transfer request. The host transmits the value transfer request to the backend. After receiving the value transfer request, the backend queries an ID card photo (a standard image) of the user according to the user mobile phone number and queries a target face image of the user according to each FACE_KEY. Then, a similarity between the standard image and each target face image is obtained through comparison based on a face similarity model to complete face recognition. If the face recognition is successful, a value transfer operation is performed based on the value transfer information.

In the method provided by one embodiment of this application, hardware research and development is performed for the camera component, and the network module and the security module are integrated in the camera component, which can isolate the camera component in the TEE, to transmit the target face image based on the TEE. There is no need to pass through the REE hardware resource (host) to transmit the target face image. The REE hardware resource can only obtain the masked image and FACE_KEY, but cannot obtain the target face image. The camera component and the REE hardware resource are isolated in data, which ensures the security of the face data source and the security of the face image transmission process, thereby ensuring the security of the value transfer process based on face recognition.

Figure 6:
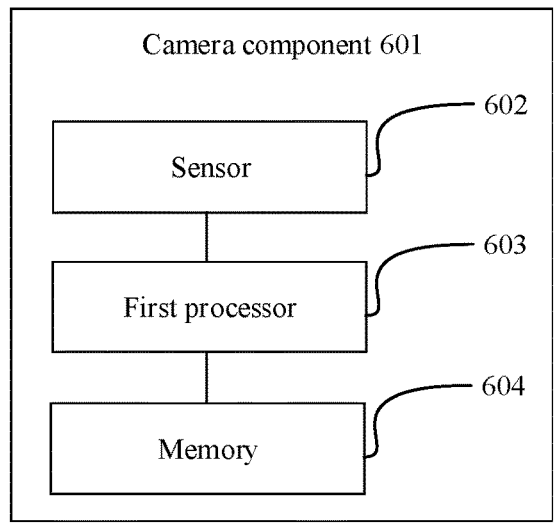
FIG. 6 is a schematic structural diagram of a apparatus for transmitting face image data according to an embodiment of this application.

FIG. 6 is a schematic structural diagram of a apparatus for transmitting face image data according to an embodiment of this application. Referring to FIG. 6, the apparatus includes a camera component 601, the camera component 601 includes a sensor 602, a first processor 603, and a memory 604, and the memory 604 is at least one of a TEE element or an SE. The details are as follows:

The sensor 602 is configured to acquire a face data stream, and transmit the face data stream to the first processor 603;

the first processor 603 is configured to perform image screening on at least one face image in the face data stream to obtain at least one target face image, the at least one target face image meeting a target condition;

the first processor 603 is further configured to read a target web address from the memory 604; and the first processor 603 is further configured to transmit the at least one target face image to the target web address.

In the apparatus provided by one embodiment of this application, a sensor 602, a first processor 603, and a memory 604 are deployed in a camera component 601 of the apparatus. The memory 604 is at least one of the TEE element or the SE. A face data stream is acquired using the sensor 602. The face data stream is transmitted to the first processor 603 by the sensor 602. Image screening is performed on at least one face image in the face data stream by the first processor 603 to obtain at least one target face image. The at least one target face image meets a target condition. A target web address is read from the memory 604 by the first processor 603. The at least one target face image is transmitted to the target web address by the first processor 603. Since the memory 604 is at least one of the TEE element or the SE, the camera component 601 runs in the TEE, so that the transmission of the target face image does not need to pass through the REE hardware resources, avoiding the problem of the target face image being stolen due to poor REE security, and improving the security of the face image transmission process.

In one embodiment, the first processor 603 is configured to: perform liveness detection on the at least one face image, and determine each face image with a detection result being a living body as the at least one target face image.

In one embodiment, the first processor 603 is configured to:
perform quality assessment on the at least one face image to obtain a quality score of the at least one face image; and
determine each face image with a quality score greater than a score threshold as the at least one target face image.

In one embodiment, the first processor 603 is configured to:
read a target key from the memory 604;

encrypt the at least one target face image based on an encryption algorithm and the target key to obtain a face image ciphertext; and
transmit the face image ciphertext carrying the at least one target face image to the target web address.

In one embodiment, based on the apparatus composition of FIG. 6, the apparatus further includes a second processor, the second processor running in an REE;

the first processor 603 is further configured to: receive at least one face image identification, one face image identification being used for uniquely identifying one target face image in the at least one target face image; and transmit the at least one face image identification to the second processor; and the second processor is configured to transmit a user identification and the at least one face image identification.

In one embodiment, based on the apparatus composition of FIG. 6, the apparatus further includes a second processor, the second processor running in an REE;

the first processor 603 is further configured to: perform masking on the at least one face image to obtain at least one masked image; and transmit the at least one masked image to the second processor; and the second processor is configured to display the at least one masked image.

In one embodiment, the first processor 603 is configured to:
perform face detection on the at least one face image, and determine a facial feature region in the at least one face image; and perform image enhancement on the facial feature region in the at least one face image to obtain the at least one masked image.

Any combination of the foregoing optional technical solutions may be used to form an optional embodiment of this application. Details are not described herein again.

When the apparatus for transmitting face image data provided in the foregoing embodiment transmits a face image, it is illustrated with an example of division of each functional module. In one embodiment, the function distribution may be implemented by different functional modules according to requirements, that is, an internal structure of an electronic device (for example, a terminal) is divided into different functional modules, to implement all or some of the functions described above. In addition, the apparatus for transmitting face image data and the method for transmitting face image data embodiments provided in the foregoing embodiments belong to the same conception. For the specific implementation process, reference may be made to the method for transmitting face image data embodiment, and details are not described herein again.

Figure 7:
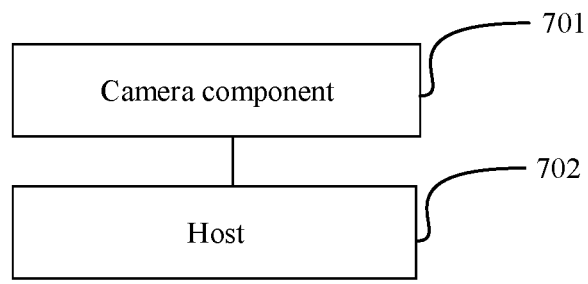
FIG. 7 is a schematic structural diagram of an apparatus for transferring value according to an embodiment of this application.

FIG. 7 is a schematic structural diagram of an apparatus for transferring value according to an embodiment of this application. Referring to FIG. 7, the apparatus includes a camera component 701 and a host 702, and the camera component 701 runs in a TEE. The details are as follows:

The camera component 701 is configured to transmit a verification request to a server, the verification request carrying at least one target face image, the at least one target face image meeting a target condition;

the camera component 701 is further configured to receive, in a case that verification of the verification request by the server is successful, a verification success response, the verification success response carrying at least one face image identification, one face image identification being used for uniquely identifying one target face image in the at least one target face image;

the camera component 701 is further configured to transmit the at least one face image identification to the host 702; and the host 702 is configured to transmit a value transfer request to the server, so that the server performs a value transfer operation based on the value transfer request, the value transfer request carrying a user identification, the at least one face image identification, and value transfer information.

In the apparatus provided by an embodiment of this application, a verification request is transmitted to the server by the camera component 701 running in the TEE, and the verification request carries at least one target face image. When verification of the verification request by the server is successful, a verification success response is received through the camera component 701, and the verification success response carries at least one face image identification. The at least one face image identification is transmitted to the host 702 by the camera component 701. A value transfer request is transmitted to the server by the host 702, the server performs a value transfer operation based on the value transfer request, and the value transfer request carries a user identification, the at least one face image identification, and value transfer information. Since the camera component 701 runs in the TEE, the data exchange between the camera component 701 and the server does not need to pass through the REE hardware resource, which ensures that the data exchange between the camera component 701 and the server is safe and reliable. After obtaining the face image identification, the camera component 701 transmits the face image identification to the host 702 running in the REE. The host 702 transmits the value transfer request carrying the face image identification to the server. Since the value transfer request carries the face image identification instead of the target face image, even if the host 702 on the REE side suffers a network attack, the target face image will not be leaked, which can effectively ensure the security of the overall value transfer process.

When the apparatus for transferring value transfers a value provided in the foregoing embodiment, it is illustrated with an example of division of each functional module. In one embodiment, the function distribution may be finished by different functional modules according to the requirements, that is, the internal structure of an electronic device (for example, a terminal) is divided into different functional modules, to implement all or some of the functions described above. In addition, the apparatus for transferring value and method for transferring value embodiments provided in the foregoing embodiments belong to the same conception. For the specific implementation process, reference may be made to the method for transferring value embodiment, and details are not described herein again.

Figure 8:
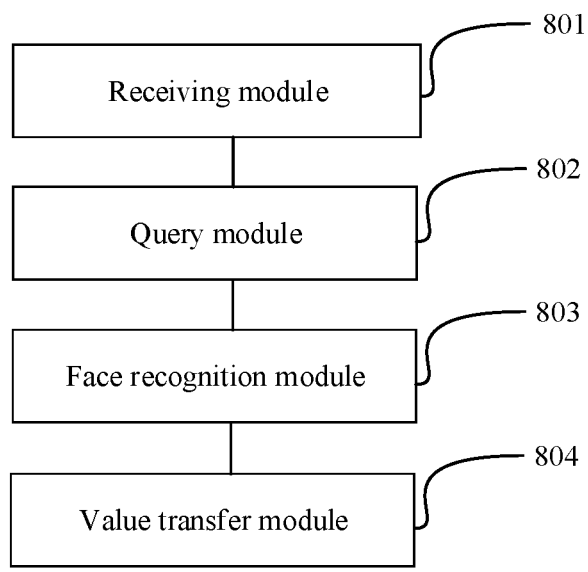
FIG. 8 is a schematic structural diagram of an apparatus for transferring value according to an embodiment of this application.

FIG. 8 is a schematic structural diagram of an apparatus for transferring value according to an embodiment of this application. Referring to FIG. 8, the apparatus includes:

a receiving module 801, configured to receive a value transfer request, the value transfer request carrying a user identification, at least one face image identification, and value transfer information, one face image identification being used for uniquely identifying one target face image, each target face image meeting a target condition;

a query module 802, configured to query at least one target face image corresponding to the at least one face image identification and a standard image corresponding to the user identification;

a face recognition module 803, configured to perform face recognition based on the at least one target face image and the standard image to obtain a recognition result; and a value transfer module 804, configured to perform, in a case that the recognition result is successful, a value transfer operation based on the value transfer information.

In the apparatus provided by one embodiment of this application, a value transfer request is received, the value transfer request carries a user identification, at least one face image identification, and value transfer information, at least one target face image corresponding to the at least one face image identification and a standard image corresponding to the user identification are queried, and face recognition is performed based on the at least one target face image and the standard image, to obtain a recognition result. When the recognition result is successful, a value transfer operation is performed based on the value transfer information. The value transfer request received by the server from the host running in the REE carries the face image identification instead of the target face image, so that even if a network attack occurs in a communication link, the target face image will not be leaked, which can effectively ensure the security of the overall value transfer process.

In one embodiment, the apparatus is further configured to:

receive a verification request, the verification request carrying the at least one target face image;

perform validity verification on the at least one target face image;

store, in a case that the verification is successful, the at least one target face image; and transmit a verification success response, the verification success response carrying the at least one face image identification.

Any combination of the foregoing optional technical solutions may be used to form an optional embodiment of this application. Details are not described herein again.

When the apparatus for transferring value transfers a value provided in the foregoing embodiment, it is illustrated with an example of division of each functional module. In one embodiment, the function distribution may be finished by different functional modules according to the requirements, that is, the internal structure of an electronic device (for example, a server) is divided into different functional modules, to implement all or some of the functions described above. In addition, the apparatus for transferring value and method for transferring value embodiments provided in the foregoing embodiments belong to the same conception. For the specific implementation process, reference may be made to the method for transferring value embodiment, and details are not described herein again.

Figure 9:
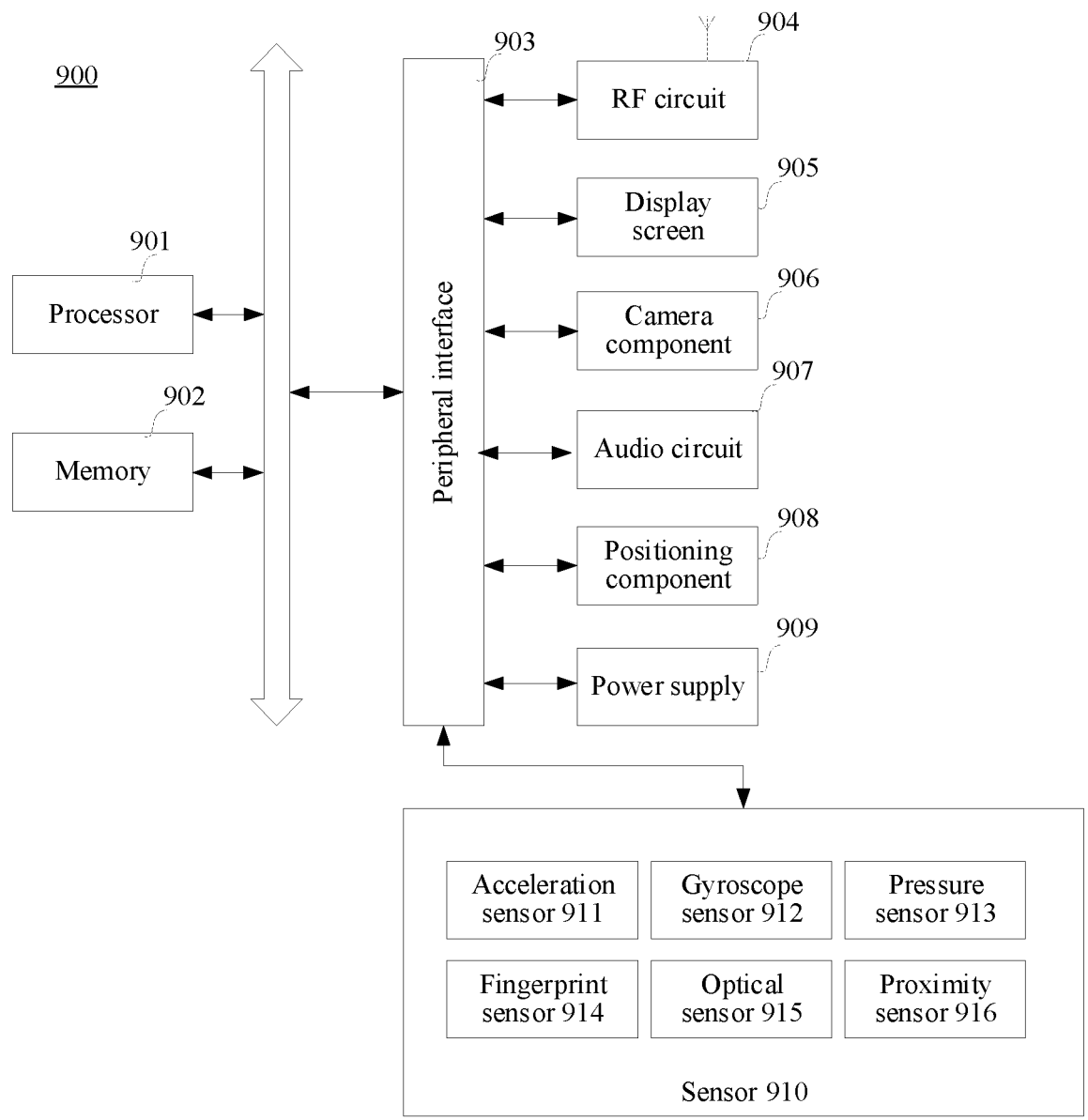
FIG. 9 is a structural block diagram of a terminal 900 according to an exemplary embodiment of this application.

FIG. 9 is a structural block diagram of a terminal 900 according to an exemplary embodiment of this application. The terminal 900 is also an electronic device. The terminal 900 may be a smartphone, a tablet computer, an MP3 player, an MP4 player, a notebook computer, or a desktop computer. The terminal 900 may also be referred to as a user equipment, a portable terminal, a laptop terminal, a desktop terminal, or the like.

Generally, the terminal 900 includes a processor 901 and a memory 902.

The processor 901 may include one or more processing cores, for example, a 4-core processor or an 8-core processor. The processor 901 may be implemented in at least one hardware form of DSP, FPGA, and PLA. The processor 901 may also include a main processor and a coprocessor. The main processor is a processor configured to process data in an awake state, and is also referred to as a CPU. The coprocessor is a low power consumption processor configured to process data in a standby state. In some embodiments, the processor 901 may be integrated with a GPU. The GPU is configured to be responsible for rendering and drawing content that a display needs to display. In some embodiments, the processor 901 may further include an AI processor. The AI processor is configured to process a computing operation related to machine learning.

The memory 902 may include one or more computer-readable storage media that may be non-transitory. The memory 902 may further include a high-speed random access memory and a non-volatile memory, such as one or more magnetic disk storage devices or a flash storage device. In some embodiments, the non-transitory computer-readable storage medium in the memory 902 is configured to store at least one instruction, and the at least one instruction being configured to be executed by the processor 901 to implement the method for transmitting face image data or the method for transferring value provided in the embodiments of this application.

In some embodiments, the terminal 900 may In some embodiments include: a peripheral interface 903 and at least one peripheral. The processor 901, the memory 902, and the peripheral interface 903 may be connected by using a bus or a signal cable. Each peripheral may be connected to the peripheral interface 903 by using a bus, a signal cable, or a circuit board. Specifically, the peripheral includes at least one of a radio frequency (RF) circuit 904, a display screen 905, a camera component 906, an audio circuit 907, a positioning component 908, and a power supply 909.

The peripheral interface 903 may be configured to connect the at least one peripheral related to input/output (I/O) to the processor 901 and the memory 902. In some embodiments, the processor 901, the memory 902, and the peripheral interface 903 are integrated on the same chip or circuit board. In some other embodiments, any one or two of the processor 901, the memory 902, and the peripheral interface 903 may be implemented on an independent chip or circuit board. This is not limited in this embodiment.

The RF circuit 904 is configured to receive and transmit an RF signal, which is also referred to as an electromagnetic signal. The RF circuit 904 communicates with a communication network and other communication devices through the electromagnetic signal. The RF circuit 904 converts an electrical signal into an electromagnetic signal for transmission, or converts a received electromagnetic signal into an electrical signal. In some embodiments, the RF circuit 904 includes an antenna system, an RF transceiver, one or more amplifiers, a tuner, an oscillator, a digital signal processor, a codec chip set, a subscriber identity module card, and the like. The RF circuit 904 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF 904 may further include a circuit related to Near-Field Communication (NFC), which is not limited in this application.

The display screen 905 is configured to display a user interface (UI). The UI may include a graph, text, an icon, a video, and any combination thereof. When the display screen 905 is a touch display screen, the display screen 905 is further capable of collecting touch signals on or above a surface of the display screen 905. The touch signal may be inputted, as a control signal, to the processor 901 for processing. In this case, the display screen 905 may be further configured to provide a virtual button and/or a virtual keyboard that are/is also referred to as a soft button and/or a soft keyboard. In some embodiments, there may be one display screen 905 disposed on a front panel of the terminal 900. In some other embodiments, there may be at least two display screens 905 respectively disposed on different surfaces of the terminal 900 or designed in a foldable shape. In still some other embodiments, the display screen 905 may be a flexible display screen, disposed on a curved surface or a folded surface of the terminal 900. Even, the display screen 905 may be further set to have a non-rectangular irregular pattern, that is, a special-shaped screen. The display screen 905 may be prepared by using materials such as a liquid crystal display (LCD), an organic light-emitting diode (OLED), or the like.

The camera component 906 is configured to capture images or videos. In some embodiments, the camera component 906 includes a front-facing camera and a rear-facing camera. Generally, the front-facing camera is disposed on a front panel of the terminal, and the rear-facing camera is disposed on a rear surface of the terminal. In some embodiments, there are at least two rear-facing cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 906 may further include a flashlight. The flash may be a single-color-temperature flash, or may be a double-color-temperature flash. The double-color-temperature flash refers to a combination of a warm-light flash and a cold-light flash, and may be used for light compensation under different color temperatures.

The audio circuit 907 may include a microphone and a speaker. The microphone is configured to collect sound waves of users and surroundings, and convert the sound waves into electrical signals and input the signals to the processor 901 for processing, or input the signals to the RF circuit 904 to implement voice communication. For the purpose of stereo collection or noise reduction, there may be a plurality of microphones, respectively disposed at different portions of the terminal 900. The microphone may be further an array microphone or an omni-directional collection type microphone. The speaker is configured to convert electric signals from the processor 901 or the RF circuit 904 into sound waves. The speaker may be a conventional thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 907 may also include an earphone jack.

The positioning component 908 is configured to determine a current geographic location of the terminal 900, to implement navigation or a location based service (LBS). The positioning component 908 may be a positioning component based on the Global Positioning System (GPS) of the United States, the BeiDou system of China, the GLONASS System of Russia, or the GALILEO System of the European Union.

The power supply 909 is configured to supply power to components in the terminal 900. The power supply 909 may be an alternating-current power supply, a direct-current power supply, a disposable battery, or a rechargeable battery. In a case that the power supply 909 includes the rechargeable battery, the rechargeable battery may support wired charging or wireless charging. The rechargeable battery may be further configured to support a fast charge technology.

In some embodiments, the terminal 900 further includes one or more sensors 910. The one or more sensors 910 include, but are not limited to, an acceleration sensor 911, a gyroscope sensor 912, a pressure sensor 913, a fingerprint sensor 914, an optical sensor 915, and a proximity sensor 916.

The acceleration sensor 911 may detect the magnitude of acceleration on three coordinate axes of a coordinate system established by the terminal 900. For example, the acceleration sensor 911 may be configured to detect components of gravity acceleration on the three coordinate axes. The processor 901 may control, according to a gravity acceleration signal collected by the acceleration sensor 911, the touch display screen 905 to display the UI in a landscape view or a portrait view. The acceleration sensor 911 may be further configured to acquire motion data of a game or a user.

The gyroscope sensor 912 may detect a body direction and a rotation angle of the terminal 900, and may work with the acceleration sensor 911 to acquire a 3D action performed by the user on the terminal 900. The processor 901 may implement the following functions according to data collected by the gyroscope sensor 912: motion sensing (for example, the UI is changed according to a tilt operation of the user), image stabilization during shooting, game control, and inertial navigation.

The pressure sensor 913 may be disposed at a side frame of the terminal 900 and/or a lower layer of the display screen 905. When the pressure sensor 913 is disposed on the side frame of the terminal 900, a holding signal of the user on the terminal 900 may be detected. The processor 901 performs left and right hand recognition or a quick operation according to the holding signal collected by the pressure sensor 913. When the pressure sensor 913 is disposed on the low layer of the display screen 905, the processor 901 controls, according to a pressure operation of the user on the display screen 905, an operable control on the UI. The operable control includes at least one of a button control, a scroll-bar control, an icon control, and a menu control.

The fingerprint sensor 914 is configured to collect a fingerprint of the user, and the processor 901 recognizes an identity of the user according to the fingerprint collected by the fingerprint sensor 914, or the fingerprint sensor 914 recognizes the identity of the user according to the collected fingerprint. When the identity of the user is recognized as credible, the processor 901 authorizes the user to perform a related sensitive operation. The sensitive operation includes unlocking a screen, viewing encrypted information, downloading software, paying, changing a setting, and the like. The fingerprint sensor 914 may be disposed on a front surface, a back surface, or a side surface of the terminal 900. When a physical button or a vendor logo is disposed on the terminal 900, the fingerprint sensor 914 may be integrated with the physical button or the vendor logo.

The optical sensor 915 is configured to acquire ambient light intensity. In an embodiment, the processor 901 may control display luminance of the display screen 905 according to the ambient light intensity collected by the optical sensor 915. Specifically, when the ambient light intensity is relatively high, the display luminance of the display screen 905 is increased. When the ambient light intensity is relatively low, the display luminance of the display screen 905 is reduced. In another embodiment, the processor 901 may further dynamically adjust a camera parameter of the camera component 906 according to the ambient light intensity acquired by the optical sensor 915.

The proximity sensor 916, also referred to as a distance sensor, is generally disposed on the front panel of the terminal 900. The proximity sensor 916 is configured to collect a distance between the user and the front face of the terminal 900. In an embodiment, when the proximity sensor 916 detects that the distance between the user and the front surface of the terminal 900 gradually becomes smaller, the display screen 905 is controlled by the processor 901 to switch from a screen-on state to a screen-off state. In a case that the proximity sensor 916 detects that the distance between the user and the front surface of the terminal 900 gradually becomes larger, the display screen 905 is controlled by the processor 901 to switch from the screen-off state to the screen-on state.

A person skilled in the art may understand that the structure shown in FIG. 9 does not constitute a limitation to the terminal 900, and the terminal may include more or fewer components than those shown in the figure, or some components may be combined, or a different component deployment may be used.

In the foregoing embodiments, an example in which an electronic device is the terminal 900 is used to describe the internal structure of the electronic device. In some embodiments, the electronic device includes one or more sensors, one or more first processors, and one or more memories, the one or more memories being at least one of a trusted execution environment (TEE) element or a secure element (SE), the one or more memories storing at least one program code, the at least one program code being loaded and executed by the one or more first processors to implement the following operations:

performing image screening on at least one face image in a face data stream to obtain at least one target face image, the at least one target face image meeting a target condition, the face data stream being acquired by the one or more sensors;

retrieving a target web address from the one or more memories; and transmitting the at least one target face image to the target web address.

In some embodiments, the at least one program code is loaded and executed by the one or more first processors to implement the following operations:

performing liveness detection on the at least one face image, and determining each face image with a detection result being a living body as the at least one target face image.

In some embodiments, the at least one program code is loaded and executed by the one or more first processors to implement the following operations:

performing quality assessment on the at least one face image to obtain a quality score of the at least one face image; and determining each face image with a quality score greater than a score threshold as the at least one target face image.

In some embodiments, the at least one program code is loaded and executed by the one or more first processors to implement the following operations:

reading a target key from the one or more memories;

encrypting the at least one target face image based on an encryption algorithm and the target key to obtain a face image ciphertext; and transmitting the face image ciphertext carrying the at least one target face image to the target web address.

In some embodiments, the at least one program code is loaded and executed by the one or more first processors to implement the following operations:

receiving at least one face image identification, one face image identification being used for uniquely identifying one target face image in the at least one target face image;

transmitting the at least one face image identification to one or more second processors of the electronic device, the one or more second processors running in a rich execution environment (REE); and transmitting a user identification and the at least one face image identification by the one or more second processors.

In some embodiments, the at least one program code is loaded and executed by the one or more first processors to implement the following operations:

performing masking on the at least one face image to obtain at least one masked image;

transmitting the at least one masked image to one or more second processors of the electronic device, the one or more second processors running in a rich execution environment (REE); and displaying the at least one masked image on the electronic device by the one or more second processors.

In some embodiments, the at least one program code is loaded and executed by the one or more first processors to implement the following operations:

performing face detection on the at least one face image, and determining a facial feature region in the at least one face image; and performing image enhancement on the facial feature region in the at least one face image to obtain the at least one masked image.

In the foregoing embodiments, an example in which an electronic device is the terminal 900 is used to describe the internal structure of the electronic device. In some embodiments, the electronic device includes a camera component and a host, and the camera component includes one or more first processors and one or more memories, the one or more memories being at least one of a trusted execution environment (TEE) element or a secure element (SE), the one or more memories storing at least one program code, the at least one program code being loaded and executed by the one or more first processors to implement the following operations:

transmitting a verification request to a server, the verification request carrying at least one target face image, the at least one target face image meeting a target condition;

receiving, in a case that verification of the verification request by the server is successful, a verification success response, the verification success response carrying at least one face image identification, one face image identification being used for uniquely identifying one target face image in the at least one target face image;

transmitting the at least one face image identification to the host; and transmitting a value transfer request to the server by the host, so that the server performs a value transfer operation based on the value transfer request, the value transfer request carrying a user identification, the at least one face image identification, and value transfer information.

Figure 10:
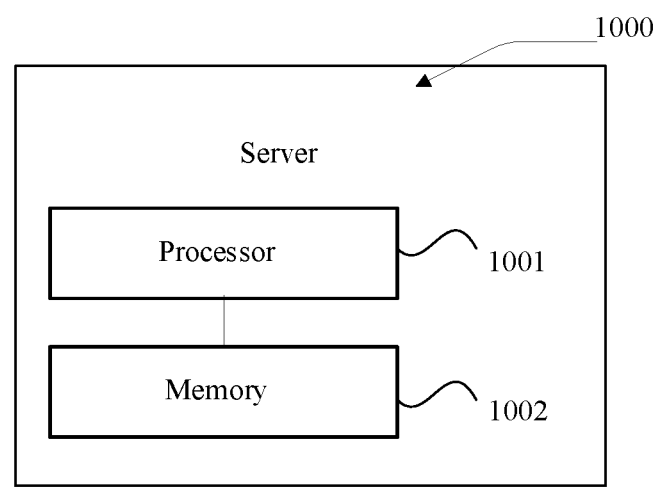
FIG. 10 is a schematic structural diagram of a server according to an embodiment of this application.

FIG. 10 is a schematic structural diagram of a server according to an embodiment of this application. A server 1000 is also an electronic device. The server 1000 may vary greatly because a configuration or performance varies, and may include one or more processors (CPU) 1001 and one or more memories 1002. The memory 1002 stores at least one program code, and the at least one program code is loaded and executed by the processor 1001 to implement the method for transferring value provided in the foregoing embodiments. Certainly, the server 1000 may also have a wired or wireless network interface, a keyboard, an input/output interface and other components to facilitate input/output. The server 1000 may also include other components for implementing device functions. Details are not described herein.

In the foregoing embodiments, an example in which an electronic device is the server 1000 is used to describe the internal structure of the electronic device. In some embodiments, the electronic device includes one or more processors and one or more memories, the one or more memories storing at least one program code, the at least one program code being loaded and executed by the one or more processors to implement the following operations:

receiving a value transfer request, the value transfer request carrying a user identification, at least one face image identification, and value transfer information, one face image identification being used for uniquely identifying one target face image, each target face image meeting a target condition;

querying at least one target face image corresponding to the at least one face image identification and a standard image corresponding to the user identification;

performing face recognition based on the at least one target face image and the standard image to obtain a recognition result; and performing, in a case that the recognition result is successful, a value transfer operation based on the value transfer information.

In some embodiments, the at least one program code is loaded and executed by the one or more processors to implement the following operations:

receiving a verification request, the verification request carrying the at least one target face image;

performing validity verification on the at least one target face image;

storing, in a case that the verification is successful, the at least one target face image; and transmitting a verification success response, the verification success response carrying the at least one face image identification.

In an exemplary embodiment, a computer-readable storage medium, for example, a memory including at least one program code is further provided. The at least one program code may be executed by a processor in a terminal to implement the method for transmitting face image data or the method for transferring value in the foregoing embodiments. For example, the computer-readable storage medium may be a read-only memory (ROM), a RAM, a compact disc read-only memory (CD-ROM), a magnetic tape, a floppy disk, an optical data storage device, or the like.

In some embodiments, the storage medium stores at least one program code, and the at least one program code is loaded and executed by the first processor of the electronic device to implement the following operations:

performing image screening on at least one face image in a face data stream to obtain at least one target face image, the at least one target face image meeting a target condition, the face data stream being acquired by a sensor of the electronic device;

retrieving a target web address from a memory of the electronic device, the memory being at least one of a TEE element or an SE; and transmitting the at least one target face image to the target web address.

In some embodiments, the at least one program code is loaded and executed by the first processor to implement the following operations:

performing liveness detection on the at least one face image, and determining each face image with a detection result being a living body as the at least one target face image.

In some embodiments, the at least one program code is loaded and executed by the first processor to implement the following operations:

performing quality assessment on the at least one face image to obtain a quality score of the at least one face image; and determining each face image with a quality score greater than a score threshold as the at least one target face image.

In some embodiments, the at least one program code is loaded and executed by the first processor to implement the following operations:

reading a target key from the memory;

encrypting the at least one target face image based on an encryption algorithm and the target key to obtain a face image ciphertext; and transmitting the face image ciphertext carrying the at least one target face image to the target web address.

In some embodiments, the at least one program code is loaded and executed by the first processor to implement the following operations:

receiving at least one face image identification, one face image identification being used for uniquely identifying one target face image in the at least one target face image;

transmitting the at least one face image identification to a second processor of the electronic device, the second processor running in a rich execution environment (REE); and transmitting a user identification and the at least one face image identification by the second processor.

In some embodiments, the at least one program code is loaded and executed by the first processor to implement the following operations:

performing masking on the at least one face image to obtain at least one masked image;

transmitting the at least one masked image to a second processor of the electronic device, the second processor running in a rich execution environment (REE); and displaying the at least one masked image on the electronic device by the second processor.

In some embodiments, the at least one program code is loaded and executed by the first processor to implement the following operations:

performing face detection on the at least one face image, and determining a facial feature region in the at least one face image; and performing image enhancement on the facial feature region in the at least one face image to obtain the at least one masked image.

In some embodiments, the storage medium stores at least one program code, and the at least one program code is loaded and executed by the first processor of the electronic device to implement the following operations:

transmitting a verification request to a server, the verification request carrying at least one target face image, the at least one target face image meeting a target condition;

receiving, in a case that verification of the verification request by the server is successful, a verification success response, the verification success response carrying at least one face image identification, one face image identification being used for uniquely identifying one target face image in the at least one target face image;

transmitting the at least one face image identification to the host of the electronic device; and transmitting a value transfer request to the server by the host, so that the server performs a value transfer operation based on the value transfer request, the value transfer request carrying a user identification, the at least one face image identification, and value transfer information.

The first processor runs in a TEE.

In some embodiments, the storage medium stores at least one program code, and the at least one program code is loaded and executed by the processor of the electronic device to implement the following operations:

receiving a value transfer request, the value transfer request carrying a user identification, at least one face image identification, and value transfer information, one face image identification being used for uniquely identifying one target face image, each target face image meeting a target condition;

querying at least one target face image corresponding to the at least one face image identification and a standard image corresponding to the user identification;

performing face recognition based on the at least one target face image and the standard image to obtain a recognition result; and performing, in a case that the recognition result is successful, a value transfer operation based on the value transfer information.

In some embodiments, the at least one program code is loaded and executed by the processor of the electronic device to implement the following operations:

receiving a verification request, the verification request carrying the at least one target face image;

performing validity verification on the at least one target face image;

storing, in a case that the verification is successful, the at least one target face image; and transmitting a verification success response, the verification success response carrying the at least one face image identification.

In some embodiments, a computer program or computer program product including at least one program code is further provided, the computer program or computer program product, when run on a computer device, causing the computer device to perform any possible implementation in the method for transmitting face image data or the method for transferring value provided in the foregoing embodiments. Details are not described herein.

A person of ordinary skill in the art may understand that all or some of the steps in the foregoing embodiments may be implemented by hardware or a program instructing relevant hardware. The program may be stored in a computer-readable storage medium. The storage medium may be: a ROM, a magnetic disk, or an optical disc, or the like.

The foregoing descriptions are embodiments of this application, but are not intended to limit this application. Any modification, equivalent replacement, or improvement made within the spirit and principle of this application shall fall within the protection scope of this application.

What is claimed is:

1. A method for transmitting face image data, applicable to a camera component of a terminal, the camera component comprising a sensor, a first processor, and a memory, the memory including one of a trusted execution environment element or a secure element, the method comprising:

acquiring a face data stream through the sensor, and transmitting the face data stream to the first processor;

performing image screening on a face image in the face data stream by the first processor to obtain at least a target face image, the target face image meeting a target condition;

retrieving a target web address from the memory by the first processor; and transmitting the target face image to the target web address by the first processor.

2. The method according to claim 1, wherein the performing image screening on the face image in the face data stream to obtain the target face image comprises:

performing liveness detection on the face image, and determining each face image with a detection result being a living body as the target face image.

3. The method according to claim 1, wherein the performing image screening on the face image in the face data stream to obtain the target face image comprises:

performing quality assessment on the face image to obtain a quality score of the face image; and identifying the face image with a quality score greater than a score threshold as the target face image.

4. The method according to claim 1, wherein the transmitting the target face image to the target web address by the first processor comprises:

retrieving a target key from the memory;

encrypting the target face image based on an encryption algorithm and the target key to obtain a face image ciphertext; and transmitting the face image ciphertext to the target web address by the first processor.

5. The method according to claim 1, wherein after the transmitting the target face image to the target web address by the first processor, the method further comprises:

receiving a face image identification, the face image identification uniquely identifying one target face image in the target face image;

transmitting the face image identification to a second processor of the terminal by the first processor, the second processor running in a rich execution environment; and transmitting a user identification and the face image identification by the second processor.

6. The method according to claim 1, wherein after the acquiring a face data stream through the sensor, and transmitting the face data stream to the first processor by the sensor, the method further comprises:

performing masking on the face image by the first processor to obtain a masked image;

transmitting the masked image to a second processor of the terminal by the first processor, the second processor running in a rich execution environment; and displaying the masked image on the terminal by the second processor.

7. The method according to claim 6, wherein the performing masking on the face image to obtain the masked image comprises:

performing face detection on the face image, and determining a facial feature region in the face image; and performing image enhancement on the facial feature region in the face image to obtain the masked image.

8. An apparatus for transmitting face image data, comprising a camera component of a terminal, the camera component comprising a sensor, a first processor, and a memory, the memory including one of a trusted execution environment element or a secure element, wherein the sensor is configured to acquire a face data stream, and transmit the face data stream to the first processor;

the first processor is configured to perform image screening on a face image in the face data stream to obtain a target face image, the target face image meeting a target condition;

the first processor is further configured to retrieve a target web address from the memory; and the first processor is further configured to transmit the target face image to the target web address.

9. The apparatus according to claim 8, wherein the first processor is further configured to:

perform liveness detection on the face image, and determine each face image with a detection result being a living body as the target face image.

10. The apparatus according to claim 8, wherein the first processor is further configured to:

perform quality assessment on the face image to obtain a quality score of the face image; and identify the face image with a quality score greater than a score threshold as the target face image.

11. The apparatus according to claim 8, wherein the first processor is further configured to:

retrieve a target key from the memory;

encrypt the target face image based on an encryption algorithm and the target key to obtain a face image ciphertext; and transmit the face image ciphertext to the target web address by the first processor.

12. The apparatus according to claim 8, wherein the first processor is further configured to:

receive a face image identification, the face image identification uniquely identifying one target face image in the target face image;

transmit the face image identification to a second processor of the terminal by the first processor, the second processor running in a rich execution environment; and transmit a user identification and the face image identification by the second processor.

13. The apparatus according to claim 11, wherein the first processor is further configured to:

perform masking on the face image by the first processor to obtain a masked image; and transmit the masked image to a second processor of the terminal by the first processor, the second processor running in a rich execution environment, and the second processor being configured to display the masked image on the terminal by the second processor.

14. The apparatus according to claim 13, wherein the first processor is further configured to:

perform face detection on the face image, and determining a facial feature region in the face image; and perform image enhancement on the facial feature region in the face image to obtain the masked image.

15. A non-transitory storage medium, storing at least one program code, the at least one program code being loaded and executed by a first processor of a camera component to implement:

receiving a face data stream acquired by a sensor of the camera component;

performing image screening on a face image in the face data stream to obtain at least a target face image, the target face image meeting a target condition;

retrieving a target web address from a memory of the camera component; and transmitting the target face image to the target web address.

16. The storage medium according to claim 15, wherein the performing image screening on the face image in the face data stream to obtain the target face image comprises:
    performing liveness detection on the face image, and determining each face image with a detection result being a living body as the target face image.

17. The storage medium according to claim 15, wherein the performing image screening on the face image in the face data stream to obtain the target face image comprises:
    performing quality assessment on the face image to obtain a quality score of the face image; and
    identifying the face image with a quality score greater than a score threshold as the target face image.

18. The storage medium according to claim 15, wherein the transmitting the target face image to the target web address comprises:
    retrieving a target key from the memory;
    encrypting the target face image based on an encryption algorithm and the target key to obtain a face image ciphertext; and
    transmitting the face image ciphertext to the target web address by the first processor.

19. The storage medium according to claim 15, wherein after the receiving a face data stream, the at least one program code further cause the first processor to perform:
    performing masking on the face image by the first processor to obtain a masked image;
    transmitting the masked image to a second processor of a terminal by the first processor, the second processor running in a rich execution environment; and
    displaying the masked image on the terminal by the second processor.

20. The storage medium according to claim 19, wherein the performing masking on the face image to obtain the masked image comprises:
    performing face detection on the face image, and determining a facial feature region in the face image; and
    performing image enhancement on the facial feature region in the face image to obtain the masked image.

* * * * *